United States Patent
Yang et al.

(10) Patent No.: US 10,487,180 B2
(45) Date of Patent: Nov. 26, 2019

(54) COMPOUNDS COMPRISING MODIFIED DIORGANOSILOXANE POLYMERS

(71) Applicant: 3M INNOVATIVE PROPERTIES COMPANY, St. Paul, MN (US)

(72) Inventors: Yu Yang, Eden Prairie, MN (US); Katherine A. Gibney, St. Paul, MN (US); Suresh Iyer, Woodbury, MN (US); Ingrid N. Haugan, St. Paul, MN (US); Chetan P. Jariwala, Woodbury, MN (US); Yifan Zhang, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 314 days.

(21) Appl. No.: 15/521,900

(22) PCT Filed: Dec. 4, 2015

(86) PCT No.: PCT/US2015/063852
§ 371 (c)(1),
(2) Date: Apr. 26, 2017

(87) PCT Pub. No.: WO2016/094199
PCT Pub. Date: Jun. 16, 2016

(65) Prior Publication Data
US 2017/0362391 A1    Dec. 21, 2017

Related U.S. Application Data

(60) Provisional application No. 62/088,750, filed on Dec. 8, 2014.

(51) Int. Cl.
*C08G 77/388* (2006.01)
*C09D 183/08* (2006.01)

(52) U.S. Cl.
CPC ......... *C08G 77/388* (2013.01); *C09D 183/08* (2013.01)

(58) Field of Classification Search
None
See application file for complete search history.

(56) References Cited

U.S. PATENT DOCUMENTS

| | | |
|---|---|---|
| 3,890,269 A | 6/1975 | Martin |
| 3,950,588 A | 4/1976 | McDougal |
| 4,661,577 A | 4/1987 | Lane |
| 5,026,890 A | 6/1991 | Webb |
| 5,214,119 A | 5/1993 | Leir |
| 5,276,122 A | 1/1994 | Akoi |
| 5,461,134 A | 10/1995 | Leir |
| 5,512,650 A | 4/1996 | Leir |
| 6,355,759 B1 | 3/2002 | Sherman |
| 7,335,786 B1 | 2/2008 | Iyer |
| 7,501,184 B2 | 3/2009 | Leir |
| 7,745,653 B2 | 6/2010 | Iyer |
| 8,268,067 B2 | 9/2012 | Iyer |
| 2007/0148474 A1 | 6/2007 | Leir |
| 2007/0148475 A1* | 6/2007 | Sherman ................ C08G 69/42 428/447 |
| 2008/0095816 A1* | 4/2008 | Gordy ..................... A61L 27/26 424/422 |
| 2008/0318057 A1 | 12/2008 | Sherman |
| 2008/0318058 A1 | 12/2008 | Sherman |
| 2010/0167978 A1 | 7/2010 | Iyer |
| 2010/0221967 A1 | 9/2010 | Iyer |
| 2011/0230633 A1 | 9/2011 | Ferenz |
| 2011/0268899 A1 | 11/2011 | Albert |
| 2013/0342809 A1 | 12/2013 | Higuchi |

FOREIGN PATENT DOCUMENTS

| | | |
|---|---|---|
| WO | WO 1989-04329 | 5/1989 |
| WO | WO 2007-075317 | 7/2007 |
| WO | WO 2007-075802 | 7/2007 |
| WO | WO 2016-094082 | 6/2016 |

OTHER PUBLICATIONS

Howarter, "Self-Cleaning and Anti-Fog Surfaces via Stimuli-Responsive Polymer Brushes", Advanced Materials, 2007, vol. 19, No. 22, pp. 3838-3843.
International Search report for PCT International Application No. PCT/US2015/063852 dated Feb. 16, 2016, 6 pages.

* cited by examiner

*Primary Examiner* — Melvin C. Mayes
*Assistant Examiner* — Stefanie J Cohen

(57) ABSTRACT

Modified poly(diorganosiloxanes), compositions, and articles comprising the same. The modified poly(diorganosiloxanes) can be soluble or dispersable in aqueous media. The articles can have modified poly(diorganosiloxanes) affixed thereto.

14 Claims, No Drawings

COMPOUNDS COMPRISING MODIFIED DIORGANOSILOXANE POLYMERS

CROSS REFERENCE TO RELATED APPLICATIONS

This application is a national stage filing under 35 U.S.C. 371 of PCT/US2015/063852, filed Dec. 4, 2015, which claims the benefit of U.S. Application No. 62/088,750, filed Dec. 8, 2014, the disclosure of which is incorporated by reference in its/their entirety herein.

TECHNICAL FIELD

Compounds comprising modified poly(diorganosiloxanes) are disclosed. Compositions and articles comprising such compounds are also disclosed.

BACKGROUND

Polymers such as polydiorganosiloxanes can be hydrophobic. However, their use can be limited because they cannot be affixed to some substrates, and also can have minimal solubility and dispersibility in aqueous media.

Some polydiorganosiloxanes are described in WO 2007/075317 (Leir et al.), WO 2007/075802 (Sherman et al.), U.S. Pat. No. 5,026,890 (Webb et al.), U.S. Pat. No. 5,276,122 (Akoi et al.), U.S. Pat. No. 5,214,119 (Leir et al.), and U.S. Pat. No. 7,501,184 (Leir et al.)

SUMMARY

A compound can have the chemical structure of Formula (I)

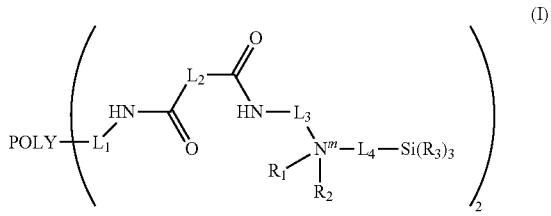

wherein:
POLY is a poly(diorganosiloxane);
$L_1$ and $L_2$ are independently a covalent bond, alkylene, aralkylene, alkenylene, alkynylene, or arylene;
$L_3$ and $L_4$ are independently alkylene, aralkylene, alkenylene, alkynylene, or arylene,
m is independently represents the charge on the N atom, which is 0 or $1^+$;
and either:
$R_1$ is H, $CH_2CH(OH)R^a$—$Si(R_5)_3$, or $R^d$-$R^e$, and
$R_2$ is absent, H, $CH_2CH(OH)R^a$—$Si(R_5)_3$, or $R^d$-$R^e$;
Or
$R_1$ and $R_2$ are covalently bound to one another, and are together alkylene, aralkylene, alkenylene, alkynylene, arylene, or any of the preceding substituted with hydroxy;
$R_3$ is independently hydroxy, alkoxy, or alkyl, provided that at least one $R_3$ is either hydroxy or alkoxy.
$R^a$ is alkylene or $R^b$—O—$R^c$,
$R^b$ is alkylene,
$R^c$ is alkylene,
$R^d$ is alkylene,
$R^e$ is $Si(R_5)_3$, $SO_3H$ or a salt thereof, or $CO_2H$ or a salt thereof,
and $R_5$ is alkyl, alkoxy, or hydroxy, with the proviso that at least one $R_5$ is alkoxy or hydroxy.

Compositions containing such compounds are also described.

Articles, particularly glass articles, having such compounds affixed thereto are also described.

DETAILED DESCRIPTION

Throughout this disclosure, singular forms such as "a," "an," and "the" are often used for convenience; however, it should be understood that the singular forms are meant to include the plural unless the singular alone is explicitly specified or is clearly indicated by the context.

Some terms used in this application have special meanings, as defined herein. All other terms will be known to the skilled artisan, and are to be afforded the meaning that a person of skill in the art at the time of the invention would have given them.

"Independently," when used in reference to the identify of one or more variable elements, means that each occurrence of any of the variable elements may have the same or different identity, within the specified limitations, regardless of the identity of any other occurrence of the reference element. Thus, if there are two occurrences of element "E," and element E can be independently selected from identity A or identity B, each of the two occurrences of E can be either A or B, in any combination (e.g., AA, AB, BA, or BB)

"Alkyl" refers to a molovalent aliphatic hydrocarbon radical. Alkyl radicals can have any number of carbon atoms. Many alkyl groups are from $C_1$ to $C_{30}$. Some alkyl radicals can be $C_1$ or greater, such as $C_2$ or greater, $C_4$ or greater, $C_6$ or greater, or $C_8$ or greater. Some alkyl radicals can be $C_{22}$ or smaller, $C_{16}$ or smaller, $C_{12}$ or smaller, $C_8$ or smaller, or $C_4$ or smaller. Unless otherwise indicated, any alkyl radicals can independently be linear, branched, cyclic, or a combination thereof (e.g., a cyclic alkyl can also have a linear or branched component.) Exemplary alkyl radicals include methyl, ethyl, propyl, isopropyl, n-butyl, t-butyl, sec-butyl, iso-butyl, 2-ethyl hexyl, iso-octyl, dodecyl, hexadecyl, behenyl, and the like.

"Aryl" refers to a monovalent aromatic radical. An aryl radicals can include only carbon and hydrogen or may also include one or more heteroatoms, such as one or more of oxygen, nitrogen, and sulfur. Aryl radicals can have aromatic rings with three or more atoms, four or more atoms, or five or more atoms. Aryl radicals can have rings with ten or fewer atoms, eight or fewer atoms, seven or fewer atoms, or six or fewer atoms. Exemplary aryl radicals include phenyl, furanyl, naphthyl, anthracenyl, and the like. Phenyl is a common aryl substituent.

"Aralkyl" refers to a monovalent radical including an alkyl component and an aryl component. Aralkyl radicals can have a total of or six or more carbon atoms, seven or more carbon atoms, eight or more carbon atoms, nine or more carbon atoms, or ten or more carbon atoms. Aralkyl radicals can have a total of twenty-two or fewer carbon atoms, sixteen or fewer carbon atoms, twelve or fewer carbon atoms, ten or fewer carbon atoms, eight or fewer carbon atoms, seven or fewer carbon atoms, or six or fewer carbon atoms. Exemplary aralkyl radicals include xylyl, toluenyl, and the like.

"Alkenyl" refers to a monovalent unsaturated hydrocarbon radical having one or more carbon-carbon double bonds. Many alkenyl radicals are from $C_2$ to $C_{30}$. Some alkenyl radicals can be $C_2$ or greater, such as $C_3$ or greater, $C_4$ or greater, $C_6$ or greater, $C_8$ or greater, or $C_{10}$ or greater. Some alkenyl radicals can be $C_{22}$ or smaller, $C_{16}$ or smaller, $C_{12}$ or smaller, $C_8$ or smaller, or $C_4$ or smaller. Unless otherwise indicated, any alkenyl radical can be monounsaturated or polyunsaturated alkenyl. Exemplary alkenyl radicals include linoleyl, oleyl, myristoyl, palmitoyl, hexadecatrienyl, eicosatrienyl, eicosapentaenyl, arachidonyl, docosadienyl, adrenyl, and the like.

"Alkynyl" refers to a monovalent unsaturated hydrocarbon radical having one or more carbon-carbon triple bonds. In addition to the one or more carbon-carbon triple bonds, alkynyl radicals can also have one or more carbon-carbon double bonds. Many alkylyl radicals are from $C_2$ to $C_{30}$. Alkynyl radicals s can be, for example, $C_2$ or greater, $C_3$ or greater, $C_4$ or greater, $C_6$ or greater, $C_8$ or greater, or $C_{10}$ or greater. Alkynyl radicals can be, for example, $C_{22}$ or fewer, $C_{16}$ or fewer, $C_{12}$ or fewer, $C_8$ or fewer, or $C_4$ or fewer.

"Alkylene" refers to an aliphatic hydrocarbon diradical. Many alkylene diradicals are from $C_1$ to $C_{30}$. Alkylene diradicals can be $C_1$ or greater, $C_2$ or greater, $C_3$ or greater, $C_4$ or greater, $C_6$ or greater, or $C_8$ or greater. Alkylene diradicals can be $C_{22}$ or smaller, $C_{16}$ or smaller, $C_{12}$ or smaller, $C_{10}$ or smaller, or $C_8$ or smaller. Unless otherwise indicated, any alkylene can be linear, branched or cyclic or a combination thereof (e.g., having both a cyclic component and a linear component.) Exemplary alkylene groups include methylene, ethylene, propyl, isopropylene, n-butylene, t-butylene, sec-butylene, iso-butylene, 2-ethyl hexylene, iso-octylene, dodecylene, hexadecylene, behenylene, and the like.

"Alkenylene" refers to an unsaturated hydrocarbon diradical having one or more carbon-carbon double bonds. Many alkenylene diradicals are from $C_2$ to $C_{30}$. Alkenylene diradicals can be $C_2$ or greater, $C_3$ or greater, $C_4$ or greater, $C_6$ or greater or $C_8$ or greater. Alkenylene diradicals can be $C_{22}$ or smaller, $C_{18}$ or smaller, $C_{16}$ or smaller, $C_{12}$ or smaller, $C_{10}$ or smaller $C_8$ or smaller, or $C_6$ or smaller. Unless otherwise indicated, alkenylene diradicals can be monounsaturated or polyunsaturated, and can be linear, branched, cyclic, or a combination thereof (e.g., having both a cyclic component and a linear component.) Exemplary alkenylene groups include linoleylene, oleylene, myristoylene, palmitoylene, hexadicatrienylene, eicosatrienylene, eicosapentaenylene, arachidonylene, docosadienylene, adrenylene, and the like.

"Alkynylene" refers to an unsaturated hydrocarbon diradical having one or more carbon-carbon triple bonds. Alkynylene diradicals can also have one or more carbon-carbon double bonds. Many alkynylene diradicals are from $C_1$ to $C_{30}$. Alkynylene diradicals can be $C_2$ or greater, $C_3$ or greater, $C_4$ or greater, $C_6$ or greater or $C_8$ or greater. Alkynylene diradicals can be $C_{22}$ or smaller, $C_{18}$ or smaller, $C_{16}$ or smaller, $C_{12}$ or smaller, $C_{10}$ or smaller, $C_8$ or smaller, or $C_6$ or smaller. Unless otherwise indicated, alkynylene diradicals can be monounsaturated or polyunsaturated, and can be linear, branched, cyclic, or a combination thereof (e.g., having both a cyclic component and a linear component.)

"Arylene" refers to an aromatic diradical. Arylene diradicals can have aromatic rings with three or more atoms, four or more atoms, or five or more atom. Arylene diradicals can have rings with ten of fewer atoms, eight or fewer atoms, seven or fewer atoms, or six or fewer atoms. Suitable arylenes include phenylene, furanylene, piperidylene, naphthylene, and the like. Phenylene is a common arylene diradical.

"Aralkylene" refers to a diradical including an alkyl component and an aryl component. Aralkylene diradicals can have a total of three or more carbon atoms, four or more carbon atoms, five or more carbon atoms, six or more carbon atoms or seven or more carbon atoms. Aralkylene diradicals can have a total of twenty-two or fewer carbon atoms, sixteen or fewer carbon atoms, twelve or fewer carbon atoms, ten or fewer carbon atoms, eight or fewer carbon atoms, seven or fewer carbon atoms, or six or fewer carbon atoms. Aralkylene groups include xylylene, toluenylene, and the like.

"Alkoxy" refers to a radical having the formula —O-ALK, wherein ALK is alkyl. The alkyl can include any alkyl, for example, any alkyl group referenced in the definition of "alkyl," herein. The alkyl portion of an alkoxy substituent can independently be linear, branched, cyclic, or a combination thereof (e.g., a cyclic alkyl can also have a linear or branched component.) Examples of alkoxys include methoxy, ethoxy, propoxy, isopropoxy, n-butoxy, t-butoxy, sec-butoxy, iso-butoxy, 2-ethyl hexoxy, iso-octoxy, dodecoxy, hexadecoxy, and the like. Particular examples include methoxy and ethoxy.

"Hydroxy" refers to a radical having the formula —OH.

"Carbonyl alkoxy" refers to a radical having the formula —C(O)OALK, wherein OALK is alkoxy. The alkoxy can be any alkoxy, such as those referred to under the definition of "alkoxy," herein.

"Carbonyl alkyl" refers to a radical having the formula —C(O)ALK, wherein ALK is alkyl The alkyl can be any alkyl, such as those referred to under the definition of "alkyl," herein.

"Carbonyl hydroxyl" refers to a radical having the formula —C(O)OH.

"Alkylene carbonyl alkyl" refers to an radical having the formula -ALK-C(O)-ALKYL, wherein ALK is alkylene and ALKYL is alkyl. The carbonyl alkyl substituent radical can be any carbonyl alkyl substituent radical, such as those referred to in the definition of "carbonyl alkyl," herein.

"Amino" refers to a radical with the formula —$N^c(H)_p$ $(R')_q$, wherein each R' is independently alkyl, alkenyl, alkylyl, aryl, or alkaryl, any of which can be optionally substituted, p+q is 2 or 3, and c represents the charge on the nitrogen atom, which is either 0 or $1^+$. Typically, each R' is alkyl. When p+q is 2, c is 0; when p+q is 3, c is $1^+$. Amino groups can be primary, secondary, tertiary, or quaternary depending on the value of q. Amino groups having q values of 0, 1, 2 and 3 are, respectively, primary, secondary, tertiary, and quaternary.

"Amido" refers to a radical having the formula —C(O)N(H)$_r$(R')$_s$, wherein each R' is independently alkyl, alkenyl, alkylyl, aryl, or alkaryl, any of which can be optionally substituted, and r+s is 2. Typically, each R' is alkyl.

"Sulfonyl hydroxyl" refers to a radical having with the formula —$SO_3H$.

"Sulfhydryl" refers to a radical having the formula —SH.

"Polydiorganosiloxane" refers to a polymer having the repeat unit —$Si(G)_2O$—, wherein each occurrence of G is independently an organic moiety. Each occurrence of G is often independently alkyl, aryl, alkenyl, or alkynyl. Alkyl and aryl are most common, and alkyl is more common than aryl. When G is aryl, it can be any aryl group, for example, any group referred to in the definition of "aryl," herein. Typical aryl groups include phenyl. Typical alkyl groups include those discussed with reference to the definition of alkyl, herein, and also include $C_1$ to $C_{22}$ alkyl, $C_1$ to $C_{16}$ alkyl, $C_1$ to $C_{12}$ alkyl, $C_1$ to $C_8$ alkyl, or $C_1$ to $C_4$ alkyl, such as methyl, ethyl, propyl, butyl, such as t-butyl, iso-butyl, n-butyl, and sec-butyl, and $C_8$ alkyl, such as 2-ethylhexyl and isooctyl. When not specified, the end groups of a polydiorganosiloxane can vary; typical endgroups include triorganosilyl groups and hydroxy groups, as well as terminating groups, quenching groups, and chain transfer groups.

"PDMS" refers to "polydimethylsiloxane," a polymer having the repeat unit —OSi(CH$_3$)$_2$—, that is, a polydiorganosiloxane wherein each occurrence of G is methyl. When not specified, the end groups of PDMS can vary; typical endgroups include trimethylsilyl groups and hydroxy groups, as well as terminating groups, quenching groups, and chain transfer groups.

A modified polydiorganosiloxane can have the structure of Formula (I).

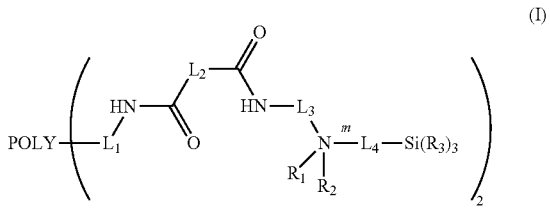

In Formula (I):
POLY is a poly(diorganosiloxane);
$L_1$ and $L_2$ are independently a covalent bond, alkylene, aralkylene, alkenylene, alkynylene, or arylene;
$L_3$ and $L_4$ are independently alkylene, aralkylene, alkenylene, alkynylene, or arylene;
m represents the charge on the N atom, which is 0 or $1^+$; and either:
$R_1$ is H, CH$_2$CH(OH)R$^a$—Si(R$_5$)$_3$, or R$^d$-R$^e$, and
$R_2$ is absent, H, CH$_2$CH(OH)R$^a$—Si(R$_5$)$_3$, or R$^d$-R$^e$;
or
$R_1$ and $R_2$ are covalently bound to one another, and are together alkylene, aralkylene, alkenylene, alkynylene, aryene, or any of the preceding substituted with hydroxy;
$R_3$ is independently hydroxy, alkoxy, or alkyl, provided that at least one $R_3$ is either hydroxy or alkoxy.
$R^a$ is alkylene or $R^b$—O—$R^c$,
$R^b$ is alkylene,
$R^c$ is alkylene,
$R^d$ is alkylene,
$R^e$ is Si(R$_5$)$_3$, SO$_3$H or a salt thereof, or CO$_2$H or a salt thereof, and $R_5$ is alkyl, alkoxy, or hydroxy, with the proviso that at least one $R_5$ is alkoxy or hydroxy.

In many cases, compounds of Formula (I) feature an $L_2$ that is a covalent bond. Such compounds are compounds of Formula (Ia).

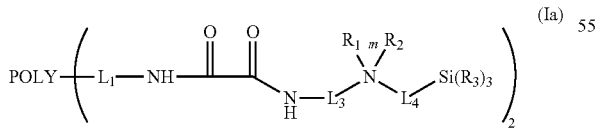

Compounds of Formula (I) and (Ia) can be useful in that they have siloxane groups Si(R$_3$)$_3$, which allow them to be affixed to glass, for example, as a coating on glass. Such coatings can impart one or more of hydrophobicity, water repellency, and ink repellency to the glass.

In compounds of Formula (I) or (Ia), POLY can be any suitable divalent radical of a poly(diorganosiloxane), which is a polymer having the repeat unit —Si(G)$_2$O—, wherein each occurrence of G is independently an organic moiety. Exemplary poly(diorganosiloxanes) include, for example poly(dialkylsiloxane) wherein each G is alkyl, poly(diarylsiloxane) wherein each G is aryl, or poly(alkylaryl siloxane) wherein one G is alkyl and the other is aryl. Poly(dialkylsiloxanes) include poly(di C$_1$ to C$_{22}$ alkylsiloxane), poly(di C$_1$ to C$_{12}$ alkylsilane), poly(di C$_8$-C$_{22}$ alkylsiloxane), for example, poly(di C$_{12}$-C$_{18}$ alkylsiloxane), as well as poly(di C$_1$ to C$_4$ alkylsiloxane). The alkyl groups in a poly(dialkylsiloxane) can be the same or different. An exemplary poly(dialkylsiloxane) is PDMS. A poly(diarylsiloxane) can be any suitable poly(diarylsiloxane). Exemplary poly(diarylsiloxanes) include poly(diphenylsiloxane). Other exemplary poly(diorganosiloxanes) include poly(alkyl aryl siloxanes) wherein some organic groups are alkyl and other organic groups are aryl. In such poly(diorganosiloxanes), the alkyl and aryl groups can be the same or different. Exemplary alkyl and aryl groups include those discussed above with respect to poly(dialkylsiloxane) and poly(diarylsiloxane).

The poly(diorganosiloxane) can have any appropriate molecular weight. The molecular weight, such as the number average molecular weight, will depend on both the chemical identity of the monomer or monomers that constitute the poly(diorganosiloxane) and on the degree of polymerization, such as the number average degree of polymerization. In many cases, the number average degree of polymerization can be 10 or greater, 15 or greater, 20 or greater, 25 or greater, 30 or greater, 35 or greater, 40 or greater, 45 or greater, 50 or greater, 55 or greater, or 60 or greater. In any of those cases, the number average degree of polymerization can be no more than 300, no more than 250, no more than 200, no more than 175, no more than 150, no more than 125, no more than 100, no more than 95, no more than 90, no more than 85, no more than 80, no more than 75, or no more than 70.

The compound of Formula (I) or (Ia) can be prepared from a poly(diorganosiloxane) having an amine endgroup. Such poly(diorganosiloxanes) have been described, for example, in U.S. Pat. No. 3,890,269 (Ray), U.S. Pat. No. 4,661,577 (Jo Lane et al.), U.S. Pat. No. 5,026,890 (Webb et al.), U.S. Pat. No. 5,276,122 (Aoki et al.), U.S. Pat. No. 5,214,119 (Leir et al.), U.S. Pat. No. 5,461,134 (Leir et al.), U.S. Pat. No. 5,512,650 (Leir et al.), U.S. Pat. No. 6,355,759 (Sherman et al.), and U.S. Pat. No. 7,501,184 (Leir et al.) Also, such polydiorganosiloxanes are commercially available from Shin-Etsu Chemicals (Tokyo, Japan) and Gelest (Morrisville, Pa.). Exemplary poly(diorganosiloxanes) with amine end-groups can have the structure of Formula (II).

In Formula (II), $L_1$ can be a covalent bond to POLY. Alternatively, $L_1$ can be alkylene, aralkylene, alkenyleneylene, alkynylene, or arylene. In many cases, $L_1$ is alkylene, such as $C_1$ to $C_{16}$ alkylene, $C_1$ to Cu alkylene, $C_1$ to $C_8$ alkylene, or $C_1$ to $C_4$ alkylene. In some cases, $L_1$ is propylene. When $L_1$ is aralkylene, the alkylene portion of the aralkylene can be any suitable alkylene, such as $C_1$ to $C_{16}$ alkylene, $C_1$ to Cu alkylene, $C_1$ to $C_8$ alkylene, or $C_1$ to $C_4$ alkylene. The arylene portion can be any suitable arylene, such as phenylene, napthylene, anthrylene, pyridylene, pyrrolylene, or thionylene. When $L_1$ is aralkylene, the alkenylene can be any suitable alkyenylene, for example $C_1$ to $C_{16}$ aralkenylene, $C_1$ to Cu aralkenylene, $C_1$ to $C_8$ aralkenylene, or $C_1$ to $C_4$ aralkenylene. When $L_1$ is arylene, it can be any suitable arylene, such as arylene with five atoms, six atoms, eight atoms, ten atoms, and the like. Phenylene is a typical arylene.

In many cases, $L_1$ is alkylene. The alkylene can be linear. The alkylene can be $C_1$ or greater, such as $C_2$ or greater, $C_4$ or greater, $C_4$ or greater, $C_6$ or greater, or $C_8$ or greater. The alkylene can be $C_{22}$ or smaller, $C_{16}$ or smaller, Cu or smaller, $C_8$ or smaller, or $C_4$ or smaller. An exemplary alkylene is n-propylene.

The poly(diorganosiloxane) with amine end-groups of Formula (II) can react with a diacid or synthetic equivalent thereof of Formula (III) according to Reaction Scheme 1 to form an intermediate compound of Formula (IV).

Reaction Scheme 1

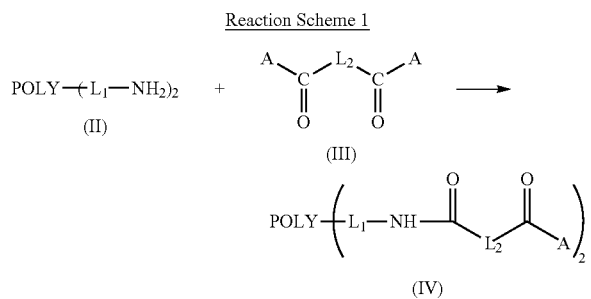

In Formula (III) $L_2$ can be a any suitable linking group, such as a covalent bond, alkylene, aralkylene, alkenylene, alkynylene, or arylene. When $L_2$ is alkylene, the alkylene can be any suitable alkylene, such as $C_1$ to $C_{22}$ alkylene, $C_1$ to $C_{16}$ alkylene, $C_1$ to Cu alkylene, $C_1$ to $C_8$ alkylene, or $C_1$ to $C_4$ alkylene. When $L_2$ is aralkylene, the alkylene portion of the aralkylene can be any suitable alkylene, such as $C_1$ to $C_{22}$ alkylene, $C_1$ to $C_{16}$ alkylene, $C_1$ to Cu alkylene, $C_1$ to $C_8$ alkylene, or $C_1$ to $C_4$ alkylene. The arylene portion can be any suitable arylene, such as phenylene, napthylene, anthrylene, pyridylene, furanylene, or pyrrolylene. When $L_2$ is alkenylene, the alkenylene can be any suitable alkyenylene, for example $C_2$ to $C_{16}$ alkenylene, $C_2$ to $C_{12}$ alkenylene, $C_2$ to $C_8$ alkenylene, or $C_2$ to $C_4$ alkenylene. When $L_2$ is alkynylene, it can be any suitable alkynylene, such as $C_2$ to $C_{16}$ alkynylene, $C_2$ to $C_{12}$ alkynylene, $C_2$ to $C_8$ alkynylene, or $C_2$ to $C_4$ alkynylene. When $L_2$ is arylene, it can be any suitable arylene, such as arylene with five atoms, six atoms, eight atoms, ten atoms, and the like. Phenylene is a typical arylene.

The nature of $L_2$ will depend on the identity of the compound of Formula (III). For example, when the compound of Formula (III) is oxalic acid or a synthetic equivalent thereof, $L_2$ is a covalent bond. When the compound of Formula (III) is malonic acid or a synthetic equivalent thereof, $L_2$ is methylene. The compound of Formula (III) can also be, for example and without limitation, succinic acid, glutaric acid, adipic acid, pimelic acid, suberic acid, azelaic acid, sebacic acid, or a synthetic equivalent of any of the foregoing. Thus $L_2$ can be, for example, ethylene, n-propylene, n-butylene, n-pentylene, n-hexylene, n-heptylene, or n-octylene. When $L_2$ is arylene, it can be, for example, phenylene, in which case the compound of Formula (III) is ortho-, iso-, or terephthalic acid, or synthetic equivalents thereof. $L_2$ can also be alkenylene, such as $C_2$ alkenylene, in which case the compound of Formula (III) can be maleic acid or fumaric acid, or synthetic equivalents thereof.

Most commonly, the compound of Formula (III) is oxalic acid or an oxalate. In such cases, $L_2$ is a covalent bond.

In the compounds of Formulas (III) and (IV), A can independently be hydroxy, alkoxy, haloalkoxy, halogen, such as chlorine, bromine, or iodine, or a leaving group, such as the leaving groups discussed below. Thus, the reaction of Reaction Scheme 1 can use a dicarboxylic acid form of the compound of Formula (III), in which case both instances of A are hydroxy. While this is acceptable, it can be convenient to instead use synthetic equivalents of the dicarboxylic acid. Such synthetic equivalents can be easier to handle or more reactive towards the amine endgroups of the poly(diorganosiloxane) than the dicarboxylic acid. Synthetic equivalents include acid chlorides and acid bromides, as well as esters such as methyl and ethyl esters. Acid chlorides and acid bromides have the structure of Formula (III) wherein A is Cl or Br, respectively. They can be obtained commercially or synthesized by reaction of the dicarboxylic acid with a suitable reagent, such as thionyl chloride, thionyl bromide, phosphorous pentachloride, phosphorous pentabromide, and similar reagents. Esters can also be obtained commercially or by reaction of the dicarboxylic acid with a suitable alcohol, such as methanol or ethanol, under esterification conditions, for example, in the presence of an acid or base catalyst. Exemplary esters include alkyl esters, wherein A is alkoxy, and haloalkyl esters, wherein A is haloalkoxy, most commonly fluoroalkoxy such as $OCF_3$. A can also be haloaryloxy or haloalkaryloxy. A can also be other suitable leaving groups, such as triflate, mesylate, and the like. Examples of A include OH, Cl, Br, alkoxy, such as methoxy or ethoxy, $OCF_3$, and triflate. Most commonly, an ester is employed, wherein A is alkoxy. The alkoxy is most often $C_1$-$C_4$ alkoxy, such as methoxy or ethoxy.

When both instances of A are ethoxy and $L_2$ is a covalent bond, the compound of Formula (III) is diethyl oxalate.

The reaction of Reaction Scheme 1 can take place under any conditions suitable for amidation, that is, the formation of amides. In many cases, contacting the compounds of Formula (II) and Formula (III) with stirring at ambient temperature is sufficient. The compound of Formula (III) can be added in stoichiometric excess in order to facilitate high yields and to minimize the formation of oligomers and polymers. In such cases, excess compound of Formula (III) can be present in the product, and removal of such excess compound can be desirable in some circumstances. In some, a catalyst can be added to facilitate the reaction. The catalyst can be an acid or base, such as an Arrhenius acid or base. Most commonly, when a catalyst is used, it is an Arrhenius acid, typically a mineral acid. Suitable mineral acids include hydrochloric acid, hydrobromic acid, phosphoric acid, nitric acid, nitrous acid, and sulfuric acid. Alternatively, a strong base such as sodium methoxide, sodium borohydride, methyllithium, or butyllithium can be used to facilitate the reaction. The strong base can deprotonate the primary amine in Formula (II), thereby increasing the reactivity of the compound of Formula (II) with the compound of Formula (III).

An inert solvent can be used in some cases. The inert solvent is typically one that does not react under amidation conditions. Exemplary inert solvents include ethers, ketones, and aromatic solvents, such as diethyl ether, acetone, methyl ethyl ketone, toluene, and benzene. The inert solvent is not required because the reaction can be conducted neat. Neat reactions are particularly convenient because it is not necessary to remove solvent in order to obtain pure product. However, byproducts can be produced during the reaction. Removal of such byproducts can be desirable in some circumstances. When removal of such byproducts is desirable, it can be accomplished by any suitable method. Suitable methods, which include column chromatography and distillation, can be selected depending on the nature of the byproduct.

In many cases, the reaction of Reaction Scheme 1 can be accomplished without the use of solvent and at ambient temperature, especially when the compound of Formula (III) is an acid chloride, acid bromide, or ester. In such cases, the compounds of Formulas (II) and (III) can be mixed and allowed to stir at ambient temperature for one to three days. For example, when diethyl oxylate is used as the compound of Formula (III), the ethyl oxylate can be added to the compound of Formula (II) without the use of solvent and the reaction can proceed to completion after stirring for two days at ambient temperature.

The product of the reaction between the compounds of Formulas (II) and (III) is an intermediate compound of Formula (IV).

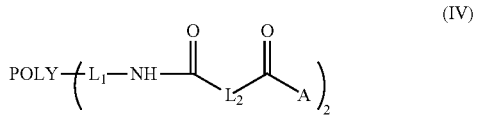

(IV)

In the intermediate compound of Formula (IV), POLY, $L_1$ and $L_2$ come from the compounds of Formulas (II) and (III), and therefore are defined in the same manner as in the compounds of Formulas (II) and (III). Notably, while A in Formula (IV) is defined the same way as in the compound of Formula (III), the A in Formula (IV) need not be the same as either A in Formula (III). This is because it is possible for one or more A in Formula (III) to be hydrolyzed from its original form, for example, to hydroxy, during the reaction of Reaction Scheme 1, particularly if A in Formula (III) is chlorine or bromine. Thus, there can be more than one type of intermediate compound of Formula (IV) present after the reaction of compounds of Formulas (II) and (III).

The intermediate compound of Formula (IV) can further react with a compound of Formula (V) according to Reaction Scheme 2 to provide a compound of Formula (VI).

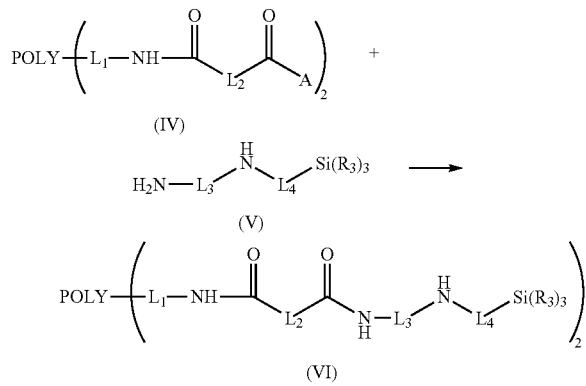

In the compound of Formula (V), $L_3$ can be any suitable linking group, such as alkylene, aralkylene, alkenylene, alkynylene, or. When $L_3$ is alkylene, the alkylene can be any suitable alkylene, such as $C_1$ to $C_{16}$ alkylene, $C_1$ to $C_{12}$ alkylene, $C_1$ to $C_8$ alkylene, or $C_1$ to $C_4$ alkylene. When $L_3$ is aralkylene, the alkylene portion of the aralkylene can be any suitable alkylene, such as $C_1$ to $C_{16}$ alkylene, $C_1$ to $C_{12}$ alkylene, $C_1$ to $C_8$ alkylene, or $C_1$ to $C_4$ alkylene. The arylene portion can be any suitable arylene, such as phenylene, napthylene, anthrylene, pyridylene, furanylene, pyrrolylene, or thionylene. When $L_3$ alkenylene, the alkenylene can be any suitable alkenylene, for example $C_2$ to $C_{16}$ alkenylene, $C_2$ to $C_{12}$ alkenylene, $C_2$ to $C_8$ alkenylene, or $C_2$ to $C_4$ alkenylene. When $L_3$ is alkynylene, the alkynylene can be any suitable alkynylene, for example $C_2$ to $C_{16}$ alkynylene, $C_2$ to $C_{12}$ alkynylene, $C_2$ to $C_8$ alkynylene, or $C_2$ to $C_4$ alkynylene. When $L_3$ is arylene, it can be any suitable arylene, such as the arylenes discussed above with respect to aralkylenes.

In some cases, $L_3$ is alkylene, such as $C_1$ to $C_8$ or $C_1$ to $C_6$ alkylene. In such cases, $L_3$ is often ethylene.

In the compound of Formula (V), $L_4$ can be any suitable linking group, such as alkylene, aralkylene, alkenylene, alkynylene, or arylene. When $L_4$ is alkylene, the alkylene can be any suitable alkylene, such as $C_1$ to $C_{22}$, alkylene, $C_1$ to $C_{16}$ alkylene, $C_1$ to $C_{12}$ alkylene, $C_1$ to $C_8$ alkylene, or $C_1$ to $C_4$ alkylene. When $L_4$ is aralkylene, the alkylene portion of the aralkylene can be any suitable alkylene, such as $C_1$ to $C_{22}$ alkylene, $C_1$ to $C_{16}$ alkylene, $C_1$ to $Cu$ alkylene, $C_1$ to $C_8$ alkylene, or $C_1$ to $C_4$ alkylene. The arylene portion of the aralkylene can be any suitable arylene, such as phenylene, napthylene, anthrylene, pyridylene, furanylene, pyrrolylene, thionylene, or acridylene. When $L_4$ is alkenylene, the alkenylene can be any suitable alkyenylene, for example $C_2$ to $C_{16}$ alkenylene, $C_2$ to $C_{12}$ alkenylene, $C_2$ to $C_8$ alkenylene, or $C_2$ to $C_4$ alkenylene. When $L_4$ is alkynylene, it can be any suitable alkynylene, such as $C_2$ to $C_{16}$ alkynylene, $C_2$ to $C_{12}$ alkynylene, $C_2$ to $C_8$ alkynylene, or $C_2$ to $C_4$ alkynylene. When $L_4$ is arylene, it can be any suitable arylene, such as the arylenes discussed above with respect to aralkylenes.

In some cases, $L_4$ is alkylene, such as $C_1$ to $C_{22}$, $C_1$ to $C_{16}$, $C_1$ to $C_{12}$, $C_1$ to $C_8$, $C_1$ to $C_4$ alkylene. Particular examples are propylene and butylene.

$R_3$ in Formula (V) can be independently alkyl, hydroxy or alkoxy. At least one instance of $R_3$ is either hydroxy or alkoxy, because at least one hydroxy or alkoxy group is needed to allow the compound to bond with glass. When an $R_3$ is alkyl, it can be any suitable alkyl such as $C_1$ to $C_{16}$ alkyl, $C_1$ to $C_{12}$ alkyl, $C_1$ to $C_8$ alkyl, or $C_1$ to $C_4$ alkyl. When an $R_3$ is alkoxy, it can be any suitable alkoxy such as $C_1$ to $C_{16}$ alkoxy, $C_1$ to $C_{12}$ alkoxy, $C_1$ to $C_8$ alkoxy, or $C_1$ to $C_4$ alkoxy. Ethoxy and methoxy are common.

In many cases in the compound of Formula (V), $L_3$ and $L_4$ are alkylene and each $R_3$ is alkoxy. In such cases, the compound of Formula (V) is N-[(trialkoxysilyl)alkyl]alkylenediamine. An exemplary N-[(trialkoxysilyl)alkyl]alkylenediamine is N-[3-trimethoxysilyl)propyl]ethylenediamine.

In the compound of Formula (VI), POLY, $L_1$ and $L_2$ come from the compounds of Formulas (II) and (III), and are defined in the same manner as in those compounds. $L_3$ and $L_4$ come from the compound of Formula (V), and are defined in the same manner as in Formula (V).

The reaction between the compound of Formula (IV) and the compound of Formula (V) as shown in Reaction Scheme 2 can be carried out under the same amidation conditions discussed herein with reference to the reaction between the poly(diorganosiloxane) of Formula (II) and the compound of Formula (III) as shown in Reaction Scheme 1. The reaction can be selective in that the reaction can occur only at the primary amine of the compound of Formula (V), for example a N-[(trialkoxysilyl)alkyl]alkylenediamine such as N-[3-(trimethoxysilyl)propyl]ethylenediamine, to the exclusion of any reaction occurring at the secondary amine. Thus, a single product of Formula (VI) can be formed wherein the secondary amine of the compound of Formula (V) remains a secondary amine in Formula (VI), where it can be available for further reaction.

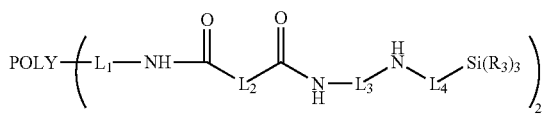
(VI)

Notably, the compound of Formula (VI) is a compound of Formula (I) wherein $R_1$ is H, $R_2$ is absent, and m is 0. If desired, the secondary amine in the compound of Formula (VI) can react with any suitable molecule, particularly molecules bearing one or more leaving groups, in order to form a tertiary amine or quaternary ammonium having, for example, one or more of an $R_1$ that is not H and an $R_2$ that is not absent.

When $L_2$ is a covalent bond, the compound of Formula (VI) is a compound of Formula (VIa).

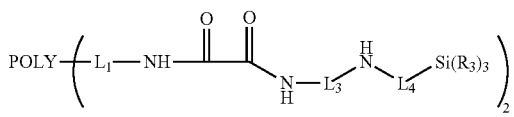
(VIa)

$R_1$ and, when it is not absent, $R_2$, can be covalently bound to the amine by any suitable reaction. For example, a compound having an electrophilic group or a good leaving group can react with the amine by way of a nucleophilic substitution reaction.

When $R_2$ is not absent, then $R_1$ and $R_2$ can either be separate groups or they can be covalently bound to one another such that $R_1$ and $R_2$ together with the nitrogen atom to which they both attached combine to form a ring structure. In the former case, when $R_1$ and $R_2$ are both present as separate groups, the compound of Formula (VI) can be a compound of Formula (VIb), and the compound of Formula (VIa) can be a compound of Formula (VIc).

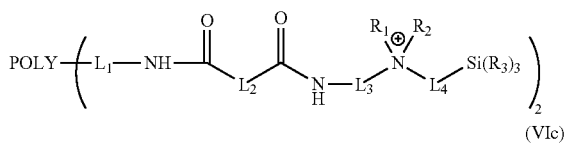
(VIb)

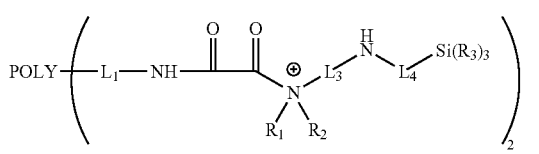
(VIc)

In the later case, when $R_1$ and $R_2$ are covalently bound to each other, $R_1$ and $R_2$ together can be alkylene, aralkylene, alkenylene, alkynylene, arylene, or any of the preceding substituted with hydroxy. In such situations, the charge, m, on the amine nitrogen is $1^+$. This charge can improve the water solubility or dispersibility of the compounds. Water solubility or dispersibility can be beneficial in that it can allow the compound to be present as solutions or dispersions in aqueous media.

When $R_1$ and $R_2$ together are alkylene or alkylene substituted with hydroxy, the alkylene can be any suitable alkylene, such as $C_2$ to $C_{16}$ alkylene, $C_2$ to $C_{12}$ alkylene, $C_2$ to $C_8$ alkylene, or $C_2$ to $C_4$ alkylene. $C_3$ alkylene is common, in which case $R_1$ and $R_2$ together with the nitrogen atom to which they are bound form a four membered ring. The hydroxy can be covalently bonded to any carbon atom in the ring. When the ring is a four membered ring $R_1$ and $R_2$ together form propylene and the hydroxy is typically bonded to the 2-carbon, i.e., the carbon atom that is not covalently bonded to the nitrogen atom.

When $R_1$ and $R_2$ together form aralkylene or aralkylene substituted with hydroxy, the alkylene portion of the aralkylene can be any suitable alkylene, such as $C_1$ to $C_{16}$ alkylene, $C_1$ to $C_{12}$ alkyl, $C_1$ to $C_8$ alkylene, or $C_1$ to $C_4$ alkylene. The arylene portion can be any suitable arylene, such as phenylene, napthylene, anthrylene, pyridylene, furanylene, pyrrolylene, or thionylene. The hydroxy substituent, if present, can be at any location on the aralkylene, but is typically on the alkylene portion of the aralkylene.

When $R_1$ and $R_2$ together form alkenylene or alkenylene substituted with hydroxy, the alkenylene can be any suitable alkyenylene, for example $C_2$ to $C_{16}$ alkenylene, $C_2$ to $C_{12}$ alkenylene, $C_2$ to $C_8$ alkenylene, or $C_2$ to $C_4$ alkenylene. When the hydroxy substituent is present it can be located at any suitable portion of the alkenylene, such as at a vinyl carbon, an allyl carbon, or another carbon.

When $R_1$ and $R_2$ together form alkynylene or alkynylene substituted with hydroxy, the alkynylene can be any suitable alkynylene, such as $C_2$ to $C_{16}$ alkynylene, $C_2$ to $C_{12}$ alkynylene, $C_2$ to $C_8$ alkynylene, or $C_2$ to $C_4$ alkynylene. When a hydroxy substituent is present, it can be located at any suitable carbon in the alkyneyle, such as alpha to one of more alkynes, beta to one or more akynes, or at any other carbon.

When $R_1$ and $R_2$ together arylene or substituted arylene, the arylene can be any suitable arylene, such as the arylenes discussed above with respect to aralylenes. When a hydroxy is present, it can be located at any suitable location on the arylene.

Compounds of Formula (VI) or (VIa) can be converted to compounds of Formula (I) or (Ia), respectively, wherein $R_1$ and $R_2$ are covalently bound together by any suitable chemical reaction. Typical chemical reactions involve reaction of the secondary amine in Formula (VI) with a molecule having two electrophilic leaving groups. Examples of suitable leaving groups, which may be the same or different, include chloride, bromide, iodide, methylsulfonate, trifluoromethansulfonate, tosylate, and mesylate. Other functional groups that can react with the secondary amine to form structures where $R_1$ and $R_2$ are covalently bound to one another include glycidyl groups.

When $R_1$ and $R_2$ are covalently bound together to form an alkylene, aralkylene, alkenylene, or alkynylene, the alkylene, alkenylene, or alkynylene can be substituted with hydroxy. Hydroxy substituents can occur when $R_1$ and $R_2$ together are a formed by reaction of a compound of Formula (I) with an epoxide bearing a leaving group. When the epoxide contains an alkylene diradical, the resulting compound will be alkylene substituted with hydroxide; likewise when the epoxide contains an aralkylene, alkenylene or alkynylene diradical, the resulting compound will contain an aralkylene, alkenylene, or alkynylene, respectively, substituted with hydroxide. An example of such a reaction is illustrated in Reaction Scheme 3, which shows the reaction of a compound of Formula (VI) with an alkylene bearing epoxide of Formula (VII) to form a compound of Formula (VIII).

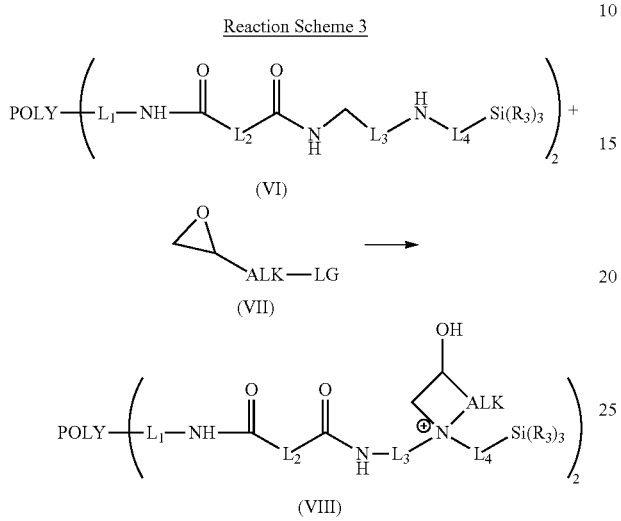

In the compound of Formula (VII), ALK is alkylene, such as $C_1$ to $C_{22}$ alkylene, $C_1$ to $C_{18}$ alkylene, $C_1$ to $C_8$ alkylene, or $C_1$ to $C_4$ alkylene. When the compound of Formula (VII) is epichlorohydrin, ALK is methylene. Other examples of ALK include ethylene, propylene, and butylene.

In the compound of Formula (VIII), ALK has the same definition as in the compound of Formula (VII). Compounds of Formula (VIII) can be water soluble or dispersible, and are often water soluble.

In the compound of Formula (VII), LG is a leaving group. Any suitable leaving group can be used. Exemplary leaving groups include chloride, bromide, iodide, methylsulfonate, trifluoromethansulfonate, tosylate, and mesylate. When the compound of Formula (VII) is epichlorohydrin, LG is chloride.

In the compound of Formula (VIII), which is the product of Reaction Scheme 3, $L_1$, $L_2$, $L_3$, $L_4$, POLY, and $R_3$ are defined as discussed herein with reference to the compounds of Formula (II) through Formula (VII). The charge on the amine nitrogen, m, is $1^+$.

$L_2$ in the compound of Formula (VIII) can be a covalent bond. In such cases, the compound of Formula (VIII) is a compound of Formula (VIIIa).

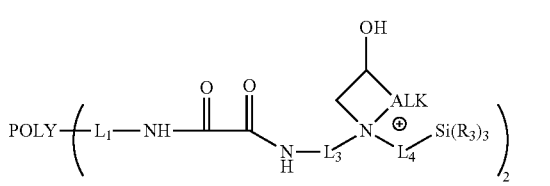

ALK in the compound of Formula (VIIIa) can be methylene. In such cases, the compound of Formula (VIIIa) is a compound of Formula (VIIIb).

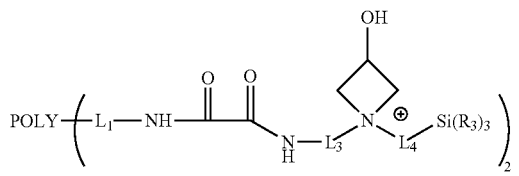

$L_1$ in the compound of Formula (VIIIb) can be alkylene, for example, propylene. In such cases the compound of Formula (VIIIb) is a compound of Formula (VIIIc).

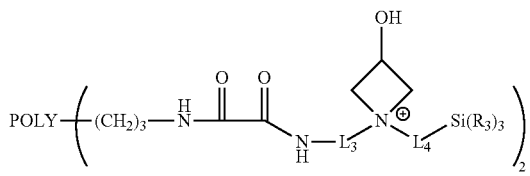

Returning to the compounds of Formulas (I) and (Ia), when $R_1$ and $R_2$ are not covalently bound to one another, $R_1$ can be H, $CH_2CH(OH)R^a$—$Si(R_5)_3$ or $R^d$-$R^e$, and $R_2$ can be absent, H, $CH_2CH(OH)R^a$—$Si(R_5)_3$ or $R^d$-$R^e$. When $R_1$ is H and $R_2$ is absent, the amine is a secondary amine having a charge, m, of 0. Examples of such a compound include the compounds of Formula (VI) and (VIa). When $R_1$ is not H and $R_2$ is neither absent nor H, then the amine is a tertiary amine having a charge, m, of $1^+$. Examples of such compounds include compounds of Formulas (VIb) and (VIc). Similarly if both $R_1$ and $R_2$ are present such that one is H and one is not H, the amine is a protonated tertiary amine and bears a charge, m, of $1^+$. As discussed above, this charge can be beneficial because it often increases the water solubility or dispersibility of the compound of Formula (I) or (Ia).

When $R_1$ is $CH_2CH(OH)R^a$—$Si(R_5)_3$, $R^a$ is alkylene or $R^bOR'$. A compound of Formula (I) or Formula (Ia) bearing this type of $R_1$ can be formed by reaction of the secondary amine of Formula (VI) with a compound of Formula (IX).

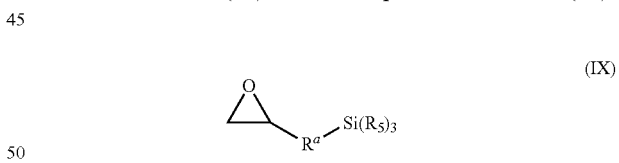

$R^a$ in the compound of Formula (IX) can be alkylene. In such cases, $R^a$ can be $C_1$ or greater, $C_2$ or greater, $C_3$ or greater, $C_4$ or greater, $C_6$ or greater, $C_8$ or greater, or $C_{10}$ or greater. $R^a$ can also be $C_{22}$ or smaller, $C_{16}$ or smaller, $C_{12}$ or smaller, $C_8$ or smaller, or $C_4$ or smaller. More commonly, $R^a$ is $R^b$—O—$R^c$. In such cases, each of $R^b$ and $R^c$ can independently be alkylene, wherein the alkylene is $C_1$ or greater, $C_2$ or greater, $C_3$ or greater, $C_4$ or greater, $C_6$ or greater, $C_8$ or greater, or $C_{10}$ or greater. $R^b$ and $R^c$ can also independently be $C_{22}$ or smaller, $C_{16}$ or smaller, $C_{12}$ or smaller, $C_8$ or smaller, or $C_4$ or smaller.

Each $R_5$ can independently be alkyl, alkoxy, or hydroxy, with the proviso that at least one $R_5$ is alkoxy or hydroxy. When $R_5$ is alkyl, it can be $C_1$ or greater $C_2$ or greater, $C_3$ or greater, $C_4$ or greater, $C_6$ or greater, $C_8$ or greater, or $C_{10}$ or greater. The alkyl can also be $C_{22}$ or smaller, $C_{16}$ or smaller, $C_{12}$ or smaller, $C_8$ or smaller, or $C_4$ or smaller. Most commonly the alkyl is ethyl or methyl. When $R_5$ is alkoxy, the alkyl portion of the alkoxy can be $C_1$ or greater, $C_2$ or greater, $C_3$ or greater, $C_4$ or greater, $C_6$ or greater, $C_8$ or greater, or $C_{10}$ or greater. The alkyl portion of the alkoxy can be $C_{22}$ or smaller, $C_{16}$ or smaller, $C_{12}$ or smaller, $C_8$ or smaller, or $C_4$ or smaller. Most commonly, the alkyl portion of the alkoxy is ethyl or methyl. In such cases, the alkoxy is ethoxy or methoxy.

A specific example of an $R_1$ of this type is $CH_2CH(OH)(CH_2)O(CH_2)_3Si(R_5)_3$. In this example, $R^a$ is $R^bOR^c$, $R^b$ is methylene and $R^c$ is propylene. An even more specific example is $CH_2CH(OH)(CH_2)O(CH_2)_3Si(OMe)_3$. In this example, $R^a$ is $R^bOR^c$, $R^b$ is methylene, $R^c$ is propylene, and each $R^5$ is methoxy. A compound of Formula (I) or Formula (Ia) bearing the type of $R_1$ can be formed by reaction of the secondary amine of Formula (Ia) bearing this type of $R_1$ can be formed by reaction of the secondary amine of Formula (VI) with a compound of Formula (IXa).

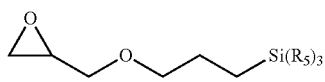

(IXa)

$R_1$ can also be $R^d$-$R^e$. In such cases, $R^d$ is alkylene. The alkylene can be $C_1$ or greater, $C_2$ or greater, $C_3$ or greater, $C_4$ or greater, $C_6$ or greater, $C_8$ or greater, or $C_{10}$ or greater. It can also be $C_{22}$ or smaller, $C_{16}$ or smaller, $C_{12}$ or smaller, $C_8$ or smaller, or $C_4$ or smaller. Examples of $R^d$ include ethylene, n-propylene, and n-butylene.

$R^e$ is $Si(R_5)_3$, $SO_3H$ or a salt thereof, or $CO_2H$ or a salt thereof wherein $R_5$ is defined as above. When a salt is used, it can be any suitable salt. Suitable salts include salts of alkaline metals, salts of alkaline earth metals, and ammonium salts. Common alkaline metals include sodium and potassium. Common alkaline earth metals include magnesium and calcium. Salts of ammonium and alkaline metals are most common.

A compound Formula (I) or Formula (Ia) bearing this type of $R_1$ group wherein $R^e$ is $SO_3H$ or a salt hereof can be formed by reaction of the secondary amine of Formula (VI) with a sulfone, for example, a compound of Formula (X). This reaction can be carried out by stirring the amine of Formula (VI) with the compound of Formula (X) at ambient temperature. Moderate heating, for example, to 60° C., can be applied if necessary.

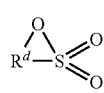

(X)

In the compound of Formula (X), $R^d$ is defined as discussed above with respect to $R_1$.

A specific example of a compound of Formula (X) wherein $R^d$ is propylene is the compound of Formula (Xa).

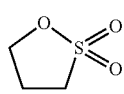

(Xa)

A compound of Formula (I) or Formula (Ia) bearing this type of $R_1$ group wherein $R^e$ is a $CO_2H$ or a salt thereof can be formed using lactones that correspond to the sulfones of Formulas (X) or (Xa). Such lactones can be, for example, a compound of Formula (Xb) or Formula (Xc).

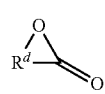

(Xb)

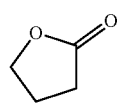

(Xc)

A compound of Formula (I) or Formula (Ia) bearing this type of $R_1$ group wherein $R^e$ is a $Si(R_5)_3$ can be formed by reaction of the secondary amine of Formula (VI) with a compound of Formula (XI).

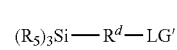

(XI)

In the compound of Formula (XI), LG' is a leaving group. Any suitable leaving group can be used. Exemplary leaving groups include chloride, bromide, iodide, methylsulfonate, trifluoromethansulfonate, tosylate, and mesylate.

An example of a compound of Formula (XI) wherein $R^d$ is propylene and LG is chloride is the compound of Formula (XIa).

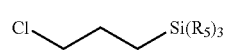

(XIa)

When $R_1$ is not H, reaction of the compound of Formula (VI) to covalently bond to $R_1$ converts the secondary amine of Formula (VI) to a tertiary amine, as shown in the compound of Formula (XII).

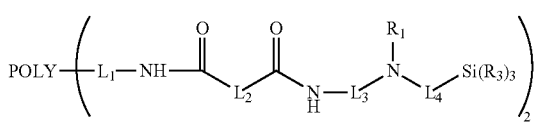

(XII)

In the compound of Formula (XII), POLY, $L_1$, $L_2$, $L_3$, $L_4$, $R_1$, $R_2$, and $R_3$ are defined as above with respect to Formula (I), except that $R_1$ is not H and $R_2$ is absent.

An example of a compound of Formula (XII) that can be formed from the compound of Formula (Ia), that is, wherein $L_2$ is a covalent bond, is the compound of Formula (XIIa).

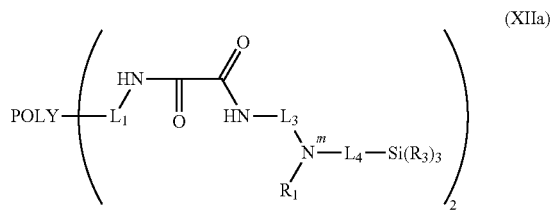
(XIIa)

A compound of Formula (XII) or Formula (XIIa) can be used without further chemical modification. One example of such a compound is the compound of Formula (XIII). In the compound of Formula (XIII), $R_1$ is $CH_2CH(OH)R^aSi(R_5)_3$

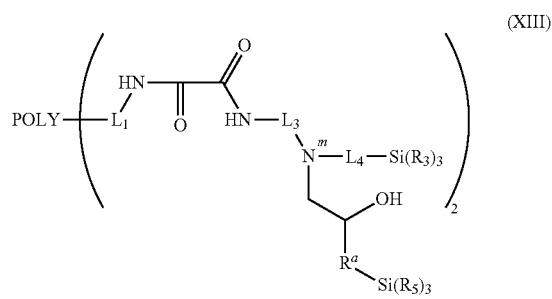
(XIII)

In some compounds of Formula (XIII), $L_1$ and $L_3$ are independently alkylene. When $L_3$ is ethylene, the compound of Formula (XIII) is a compound of Formula (XIIIa).

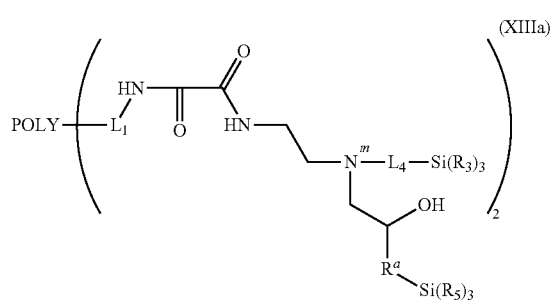
(XIIIa)

When $L_1$ in the compound of Formula (XIIIa) is propylene, the compound of Formula (XIIIa) is a compound of Formula (XIIIb).

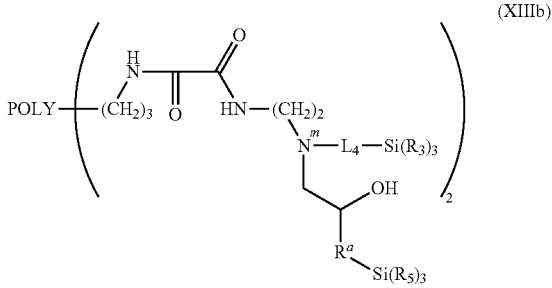
(XIIIb)

In the compound of Formula (XIIIb), $R^a$ can be $R^b$—O—$R^c$ in which case the compound of Formula (XIIIb) is the compound of Formula (XIIIc).

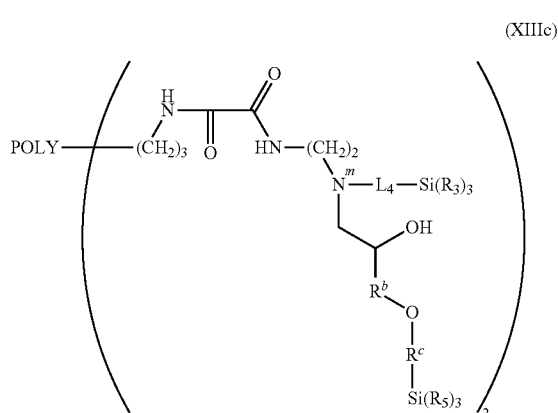
(XIIIc)

When $L_4$ is propylene, $R^b$ is methylene, and $R^c$ is propylene, then the compound of Formula (XIIIc) is the compound of Formula (XIIId).

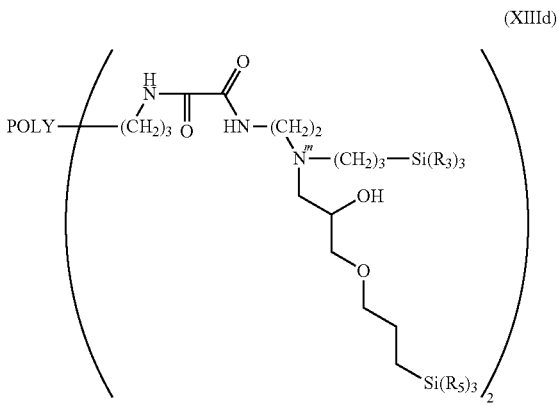
(XIIId)

In certain cases of any of the compounds of Formulas (XIII), (XIIIa), (XIIIb), (XIIIc), and (XIIId), each $R_3$ can be alkoxy, such as methoxy or ethoxy.

The tertiary amine in the compound of any of Formulas (XIII), (XIIIa), (XIIIb), (XIIIc), can be further reacted to form a compound of Formula (I) or (Ia) wherein $R_2$ is not absent. For example, a compound of Formula (XII) or (XIIa) can be protonated by reaction with an acid, such as hydrochloric acid, sulfuric acid, nitric acid, phosphoric acid, acetic acid, and the like, to form a compound of Formula (I) or Formula (Ia) wherein $R_2$ is H.

Compounds of Formula (I) or (Ia) wherein $R_2$ is neither absent or H can also be formed. For example, a compound of Formula (XII), Formula (XIIa), or any of the compounds of Formulas (XIII), (XIIIa), (XIIIb), (XIIIc), and (XIIId), can react with a compound of any of Formulas (IX), (IXa), (X), (Xa), (XI), or (XIa) to form a covalent bond to an $R_2$ group that is derived from which ever compound of Formulas (IX), (IXa), (X), (Xa), (XI), or (XIa) is used. In this case, the charge on the amine nitrogen, m, is $1^+$.

Exemplary compounds wherein $R_2$ is neither H nor absent include compounds of Formulas (XIV).

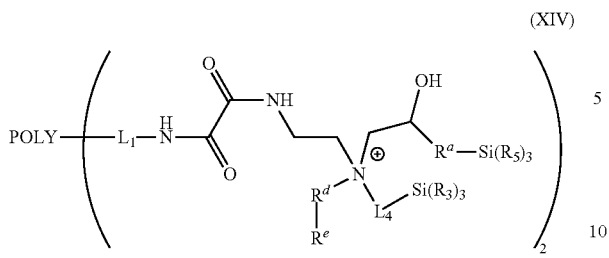
(XIV)

In the compound of Formula (XIV), $R_1$ is $CH_2CH(OH)(CH_2)_3Si(R_5)_3$, and $R_2$ is $R^d$-$R^e$. Compounds of Formula (XIV) can be formed by reacting any compound of Formula (XIII) with any compound of Formulas (X), (Xa), (XI) or (XIa) using the same reaction conditions described above with respect to reactions for forming compounds of Formula (XIII)

When $L_1$ in the compound of Formula (XIVa) is propylene, the compound of Formula (XIVa) is a compound of Formula (XIVb). Compounds of Formula (XIVb) can be formed by reacting compounds of Formula (XIIIb) with compounds of Formulas (X), (Xa), (XI) or (XIa) using the same reaction conditions described above with respect to reactions for forming compounds of Formula (XIII).

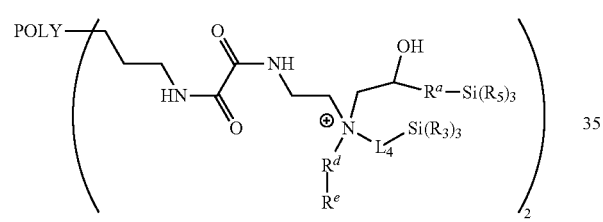
(XIVa)

In the compound of Formula (XIVa), $R^a$ can be $R^b$—O—$R^e$, in which case the compound of Formula (XIVa) is the compound of Formula (XIVb). Compounds of Formula (XIVb) can be formed by reacting compounds of Formula (XIIIb) with compounds of Formulas (X), (Xa), (XI), or (XIa) using the same reaction conditions described above with respect to reactions for forming compounds of Formula (XIII).

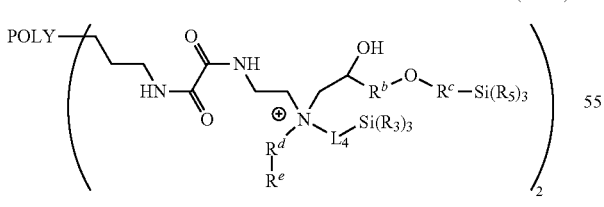
(XIVb)

When $R^e$ in compound (XIVb) is $SO_3H$ or a salt thereof, $Si(R_5)_3$, the compound of Formula (XIVb) is a compound of Formula (XV). Such compounds can be formed by the reaction of a compound of Formula (XIIIc) with compounds of Formulas (X) or (Xa) using the same reaction conditions described above with respect to reactions for forming compounds of Formula (XIII).

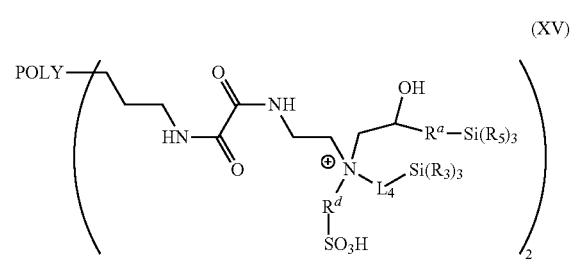
(XV)

In some compounds of Formula (XV), $R^a$ is $R^bOR^c$. Such compounds have a structure of Formula (XVa).

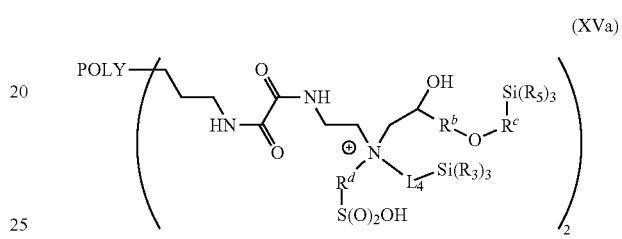
(XVa)

An exemplary compound of Formula (XVa) wherein $R^b$ is methylene, $R^b$ is ethylene, $R^c$ and $R^d$ are both propylene, $L_4$ is butylene, and each instance of $R_3$ and $R_5$ is OMe. Such compounds have a structure of Formula (XVb).

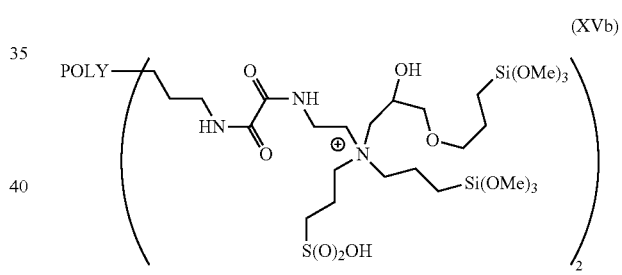
(XVb)

When $R^e$ in compound (XIVb) is $Si(R_5)_3$, the compound of Formula (XIVb) is a compound of Formula (XVI). Such compounds can be formed by the reaction of a compound of Formula (XIIIc) with compounds of Formulas (XI) or (XIa) using the same reaction conditions described above with respect to reactions for forming compounds of Formula (XIII).

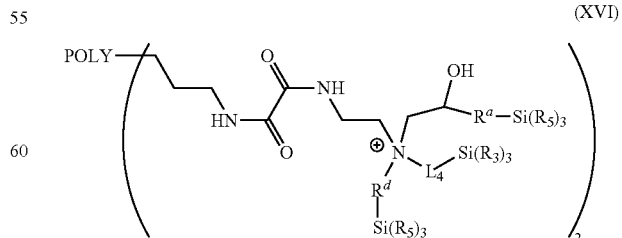
(XVI)

In some compounds of Formula (XVI), $R^a$ is $R^bOR^c$. Such compounds have a structure of Formula (XVIa).

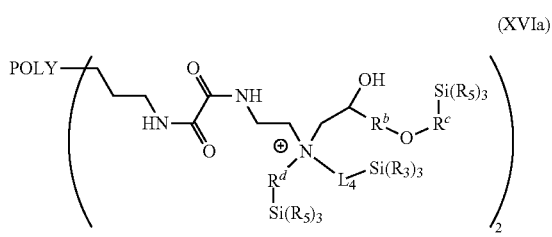

An exemplary compound of Formula (XVIa) wherein $R^b$ is methylene, $R^c$ and $R^d$ are both propylene, $L_4$ is propylene, and each $R_3$ and $R_5$ is methoxy. Such compounds have a structure of Formula (XVIb).

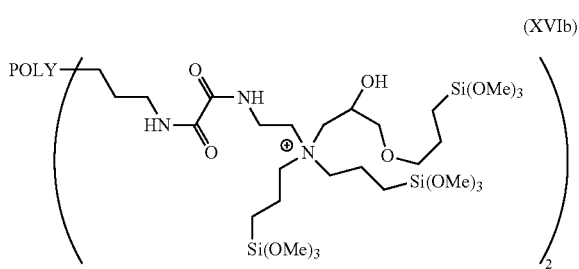

Modified poly(diorganosiloxanes) such as those described herein can have a variety of uses. For example, the compounds can be useful to form modified surfaces that repel water, as evidenced by an increased contact angle of water with the modified surfaces. In addition, the compounds can be ink repellent. Thus, the compounds can modify surfaces to resist soiling and weathering. The surfaces that can be modified include glass and ceramic surfaces. Such surfaces can be modified by way of a covalent bond between the modified poly(diogranosiloxane) and the glass or ceramic surface.

One or more modified poly(diorganosiloxanes) can be present in a composition. The composition can be an aqueous solution or aqueous dispersion. An alcohol, such as one or more of methanol, ethanol, and isopropanol, can also be included. The alcohol can increase the solubility or dispersibility of the compounds. Importantly, an alcohol is not required because the compounds often have sufficient water solubility or dispersibility without the addition of alcohol.

The composition can additionally comprise one or more surfactants. Such surfactants can be ionic surfactants or non-ionic surfactants. Ionic surfactants can be anionic surfactants, cationic surfactants, or zwitterionic surfactants. Exemplary surfactants include stearate salt, sodium lauryl sulfate, ammonium laryl sulfate, sodium laureth sulfate, polysorbate-20, polysorbate-80, lauryl glucoside, laureth glucoside, disodium lauryl sulfosucinate, cocamidopropyl betaine, and alpha-olefin sulfonate. In some cases, the one or more surfactants are at least two surfactants. Such surfactants can be particularly useful when the composition is a cleaning composition. In use, such cleaning composition can be applied to a surface, such as a glass surface, and then wiped off. The modified poly(diorganosiloxane) can remain bound to the glass surface by way of the siloxane groups.

Other suitable ingredients can also be included in the composition. Examples of ingredients that can be suitable, depending on the intended use, include fragrance, colorant, cleaning agent, tonicity adjusting agent, and pH adjusting agent.

The glass article can have one or more modified poly(diorganosiloxanes) according to this description affixed thereto. Exemplary glass articles can include slides, windows, billboards, walls, lenses, such as eyeglass lenses, prisms, mirrors, and cook tops.

Automobiles can comprise at least one glass element. A compound as described herein can be affixed to one or more of the at least one glass elements.

Listing of Exemplary Embodiments

Particular embodiments are discussed below to assist in understanding the invention, and are not to be construed as limiting. None of the particular features discussed in these embodiments is required, unless otherwise specified. The embodiments discussed below are illustrative; other embodiments are also envisioned.

Embodiment 1 is a compound having the chemical structure of formula (I)

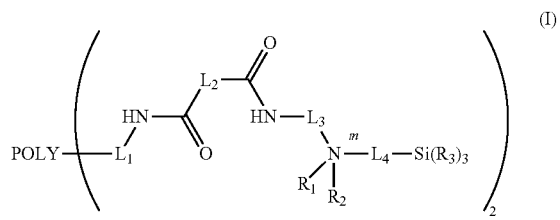

In Formula (I):
POLY is a poly(diorganosiloxane);
$L_1$ and $L_2$ are independently a covalent bond, alkylene, aralkylene, alkenylene, alkynylene, or arylene;
$L_3$ and $L_4$ are independently alkylene, aralkylene, alkenylene, alkynylene, or arylene;
m is independently represents the charge on the N atom, which is 0 or $1^+$;
and either:
$R_1$ is H, $CH_2CH(OH)R^a$—$Si(R_5)_3$, or $R^d$-$R^e$, and
$R_2$ is absent, H, $CH_2CH(OH)R^a$—$Si(R_5)_3$, or $R^d$-$R^e$;
Or
$R_1$ and $R_2$ are covalently bound to one another, and are together alkyl, aralkyl, alkenyl, alkynyl, aryl, or any of the preceding substituted with hydroxy;
$R_3$ is independently hydroxy, alkoxy, or alkyl, provided that at least one $R_3$ is either hydroxy or alkoxy.
$R^a$ is alkylene or $R^b$—O—R',
$R^b$ is alkylene,
$R^c$ is alkylene,
$R^d$ is alkylene,
$R^e$ is $Si(R_5)_3$, $SO_3H$ or a salt thereof, or $CO_2H$ or a salt thereof,
$R_5$ is
and $R_5$ is alkyl, alkoxy, or hydroxy, with the proviso that at least one $R_5$ is alkoxy or hydroxy.

Embodiment 2 is a compound of embodiment 1, wherein poly(diorganoxiloxane) is a poly(dialkylsiloxane), poly(diarylsiloxane), or Poly(alkyl aryl siloxane).

Embodiment 3 is a compound of any of the preceding embodiments, wherein the poly(dialkylsiloxane) is a poly(di $C_1$ to $C_{22}$ alkylsiloxane).

Embodiment 4 is a compound of any of the preceding embodiments, wherein the poly(dialkylsiloxane) is a poly(di $C_1$ to $C_4$ alkylsiloxane).

Embodiment 5 is a compound of any of the preceding embodiments, wherein the poly(diorganosiloxane) is PDMS.

Embodiment 6 is a compound of any of embodiments 1 or 2, wherein the poly(diarylsiloxane) is a poly(diphenylsiloxane).

Embodiment 7 is a compound of any of the preceding embodiments, wherein the poly(diorganosiloxane) has a number average degree of polymerization that is greater than 10.

Embodiment 8 is a compound of any of the preceding embodiments, wherein the poly(diorganosiloxane) has a number average degree of polymerization that is greater than 15.

Embodiment 9 is a compound of any of the preceding embodiments, wherein the poly(diorganosiloxane) has a number average degree of polymerization that is greater than 20.

Embodiment 10 is a compound of any of the preceding embodiments, wherein the poly(diorganosiloxane) has a number average degree of polymerization that is greater than 30.

Embodiment 11 is a compound of any of the preceding embodiments, wherein the poly(diorganosiloxane) has a number average degree of polymerization that is greater than 40.

Embodiment 12 is a compound of any of the preceding embodiments, wherein the poly(diorganosiloxane) has a number average degree of polymerization that is greater than 50.

Embodiment 13 is a compound of any of the preceding embodiments, wherein the poly(diorganosiloxane) has a number average degree of polymerization that is no greater than 300.

Embodiment 14 is a compound of any of the preceding embodiments, wherein the poly(diorganosiloxane) has a number average degree of polymerization that is no greater than 200.

Embodiment 15 is a compound of any of the preceding embodiments, wherein the poly(diorganosiloxane) has a number average degree of polymerization that is no greater than 100.

Embodiment 16 is a compound of any of the preceding embodiments, wherein the poly(diorganosiloxane) has a number average degree of polymerization that is no greater than 85.

Embodiment 17 is a compound of any of the preceding embodiments, wherein the poly(diorganosiloxane) has a number average degree of polymerization that is no greater than 75.

Embodiment 18 is a compound of any of the preceding embodiments, wherein $L_1$ is a covalent bond or alkylene.

Embodiment 19 is a compound of embodiment 18, wherein $L_1$ is $C_1$ to $C_{16}$ alkylene.

Embodiment 20 is a compound of embodiment 19, wherein $L_1$ propylene.

Embodiment 21 is a compound of any of the preceding embodiments, wherein $L_2$ is a covalent bond or alkylene.

Embodiment 22 is a compound of any of the preceding embodiments, wherein $L_2$ is a covalent bond.

Embodiment 23 is a compound of any of embodiments 1-21, wherein $L_2$ is alkylene.

Embodiment 24 is a compound of embodiment 23, wherein the alkylene is $C_1$ to $C_{22}$ alkylene.

Embodiment 25 is a compound of embodiment 24, wherein the alkylene is $C_1$ to $C_4$ alkylene.

Embodiment 26 is a compound of any of the preceding embodiments, wherein $L_3$ is alkylene or alkenylene.

Embodiment 27 is a compound of embodiment 26, wherein $L_3$ is alkylene.

Embodiment 28 is a compound of embodiment 27, wherein $L_3$ is $C_1$ to $C_{16}$ alkylene.

Embodiment 29 is a compound of embodiment 28, wherein $L_3$ is $C_1$ to $C_4$ alkylene.

Embodiment 30 is a compound of embodiment 29, wherein $L_3$ is ethylene.

Embodiment 31 is a compound of any of the preceding embodiments, wherein $L_4$ is alkylene or alkenylene.

Embodiment 32 is a compound of embodiment 31, wherein $L_4$ is alkylene.

Embodiment 33 is a compound of embodiment 32, wherein $L_4$ is $C_1$ to $C_{22}$ alkylene.

Embodiment 34 is a compound of embodiment 33, wherein $L_4$ is $C_1$ to $C_4$ alkylene.

Embodiment 35 is a compound of embodiment 34, wherein $L_4$ is propylene.

Embodiment 36 is a compound any of the preceding embodiments, wherein the compound has the structure of Formula (VI)

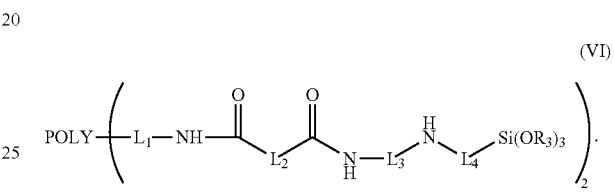

Embodiment 37 is a compound of any of embodiments 1-35, wherein $R_1$ and $R_2$ are covalently bound to one another.

Embodiment 38 is a compound of embodiment 37, wherein $R_1$ and $R_2$ together are $C_1$ to $C_4$ alkylene or $C_1$ to $C_4$ alkylene substituted with hydroxy.

Embodiment 39 is a compound of embodiment 38, wherein $R_1$ and $R_2$ are together are $C_1$ to $C_4$ alkylene substituted with hydroxy.

Embodiment 40 is a compound of embodiment 39, wherein the alkylene or substituted alkylene is propylene or propylene substituted with hydroxy.

Embodiment 41 is a compound of embodiment 40, wherein the propylene substituted with hydroxy is substituted on the carbon that is not bound to a nitrogen atom.

Embodiment 42 is a compound of embodiment 37, wherein the compound has a structure of Formula (VIII)

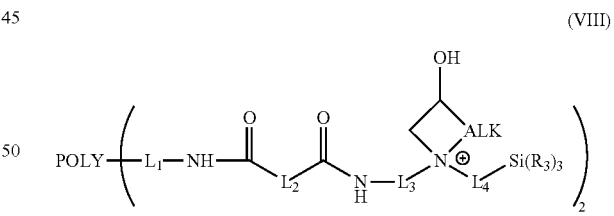

wherein ALK is alkylene.

Embodiment 43 is a compound of embodiment 42, wherein ALK is $C_1$ to $C_8$ alkylene.

Embodiment 44 is a compound of embodiment 43, wherein ALK is $C_1$ to $C_4$ alkylene.

Embodiment 45 is a compound of embodiment 44, wherein ALK is methylene.

Embodiment 46 is a compound of any of embodiments 1-35, wherein
$R_1$ is H, $CH_2CH(OH)R^a$—$Si(R_5)_3$, or $R^d$-$R^e$, and
$R_2$ is absent, H, $CH_2CH(OH)R^a$—$Si(R_5)_3$, or $R^d$-$R^e$.

Embodiment 47 is a compound of embodiment 46, wherein $R_1$ is H.

Embodiment 48 is a compound of any of embodiments 1-46, wherein $R_1$ is $CH_2CH(OH)R^a$—$Si(R_5)_3$.

Embodiment 49 is a compound of embodiment 48, wherein $R^a$ is alkylene.
Embodiment 50 is a compound of embodiment 49, wherein $R^a$ is $R^b$—O—$R^c$.
Embodiment 51 is a compound of embodiment 50, wherein $R^b$ is $C_1$ to $C_8$ alkylene.
Embodiment 52 is a compound of embodiment 51, wherein $R^c$ is methylene.
Embodiment 53 is a compound of any of embodiments 49-52, wherein $R^c$ is $C_1$ to $C_8$ alkylene.
Embodiment 54 is a compound of any of embodiments 49-53, wherein $R^c$ is propylene.
Embodiment 55 is a compound of embodiment 49-54, wherein each $R_3$ is alkoxy.
Embodiment 56 is a compound of embodiment 55, wherein each alkoxy is methoxy or ethoxy.
Embodiment 57 is a compound of any of embodiments 1-46, wherein $R_1$ is $R^d$-$R^e$.
Embodiment 58 is a compound of embodiment 57, wherein $R^d$ is $C_1$ to $C_8$ alkylene.
Embodiment 59 is a compound of embodiment 58, wherein $R^d$ is propylene.
Embodiment 60 is a compound of any of embodiments 57-59, wherein $R^e$ is $S(O)_3H$ or a salt thereof.
Embodiment 61 is a compound of any of embodiments 57-59, wherein $R^e$ is $Si(R_5)_3$.
Embodiment 62 is a compound of embodiment 61, wherein $R_5$ is alkoxy.
Embodiment 63 is a compound of embodiments 62, wherein the alkoxy is methoxy or ethoxy.
Embodiment 64 is a compound of any of embodiments 57-59, wherein $R^e$ is $CO_2H$ or a salt thereof.
Embodiment 65 is a compound of any preceding embodiment, wherein $R_2$ is absent
Embodiment 66 is a compound of any of embodiments 1-64, wherein $R_2$ is H.
Embodiment 67 is a compound of any of embodiments 1-64, wherein $R_2$ is $CH_2CH(OH)R^a$—$Si(R_5)_3$.
Embodiment 68 is a compound of embodiment 67, wherein $R^a$ is alkylene.
Embodiment 69 is a compound of embodiment 68, wherein $R^a$ is $R^b$—O—$R^c$.
Embodiment 70 is a compound of embodiment 69, wherein $R^b$ is $C_1$ to $C_8$ alkylene.
Embodiment 71 is a compound of embodiment 70, wherein at least one $R^b$ methylene.
Embodiment 72 is a compound of any of embodiments 69-71, wherein $R^c$ is $C_1$ to $C_8$ alkylene.
Embodiment 73 is a compound of any of embodiments 69-72, wherein $R^c$ is propylene.
Embodiment 74 is a compound of any of embodiments 67-73, wherein each $R_5$ is alkoxy.
Embodiment 75 is a compound of embodiment 74, wherein each alkoxy is methoxy or ethoxy.
Embodiment 76 is a compound of any of embodiments 1-64, wherein $R_2$ is $R^d$-$R^e$.
Embodiment 77 is a compound of embodiment 76, wherein $R^d$ is $C_1$ to $C_8$ alkylene.
Embodiment 78 is a compound of embodiment 77, wherein $R^d$ is propylene.
Embodiment 79 is a compound of any of embodiments 76-78, wherein $R^e$ is $S(O)_3H$ or a salt thereof.
Embodiment 80 is a compound of any of embodiments 76-78, wherein $R^e$ is $Si(R_5)_3$.
Embodiment 81 is a compound of embodiment 80, wherein $R_5$ is alkoxy.
Embodiment 82 is a compound of embodiment 81, wherein the alkoxy is methoxy or ethoxy.

Embodiment 83 is a compound of any of embodiments 76-78 wherein $R^e$ is $CO_2H$ or a salt thereof
Embodiment 84 is a compound of any of embodiments 1-64, wherein the compound has a structure of Formula (XII)

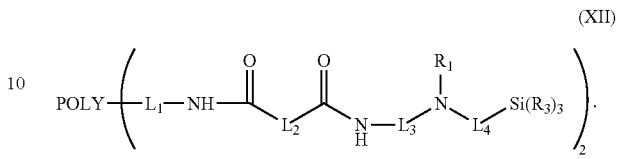

Embodiment 85 is a compound of any of embodiments 1-64 or 67-83, wherein the compound has a structure of Formula (XIIa)

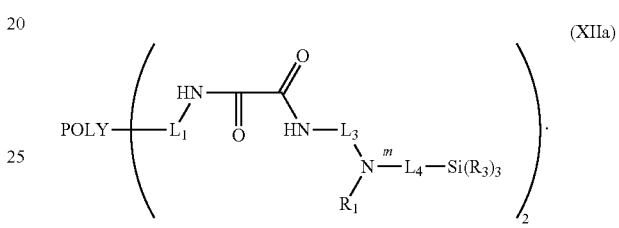

Embodiment 86 is a compound of any of embodiments 1-64 or 67-84, wherein the compound has a structure of Formula (XIII)

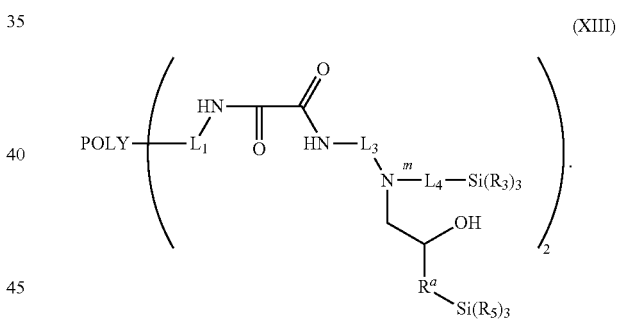

Embodiment 87 is a compound of embodiment 86, wherein the compound has a structure of Formula (XIIIa)

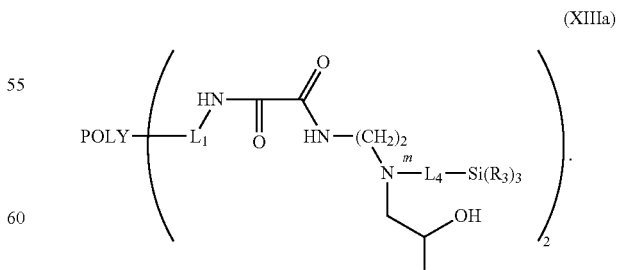

Embodiment 88 is a compound of embodiment 87, wherein the compound has a structure of Formula (XIIIb)

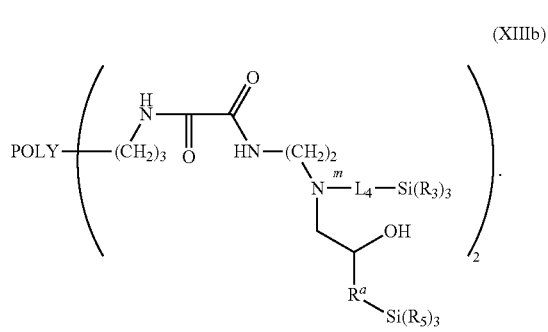
(XIIIb)

Embodiment 89 is a compound of embodiment 88, wherein the compound has a structure of Formula (XIIIc).

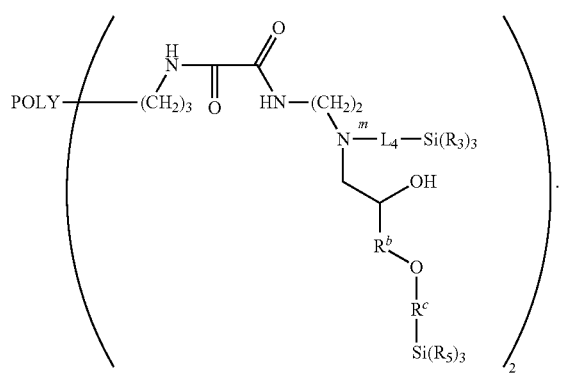
(XIIIc)

Embodiment 90 is a compound of embodiment 89, wherein the compound has a structure of Formula (XIIId)

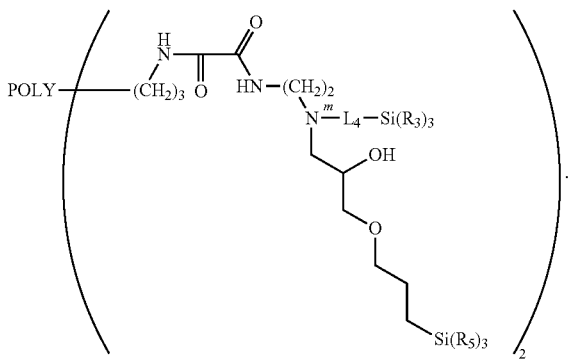
(XIIId)

Embodiment 91 is a compound of any of embodiments 1-64 or 67-85, wherein the compound has a structure of Formula (XIV)

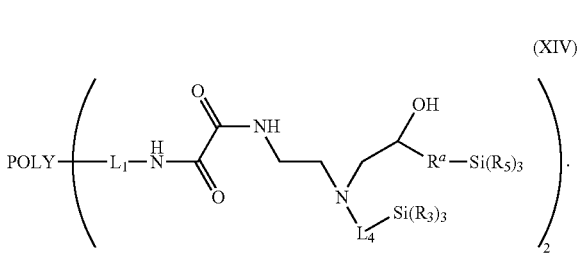
(XIV)

Embodiment 92 is a compound of embodiment 85, wherein $L_4$ is alkylene.

Embodiment 93 is a compound of any of embodiments 1-35, wherein the compound has a structure of Formula (XIVb)

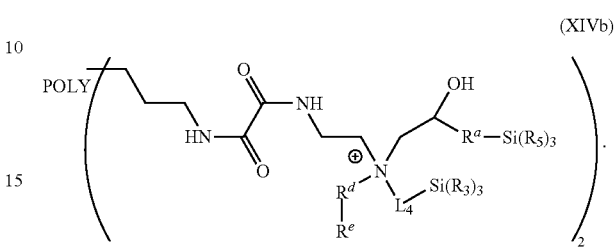
(XIVb)

Embodiment 94 is a compound of embodiment 85, wherein the compound has a structure of Formula (XIVc)

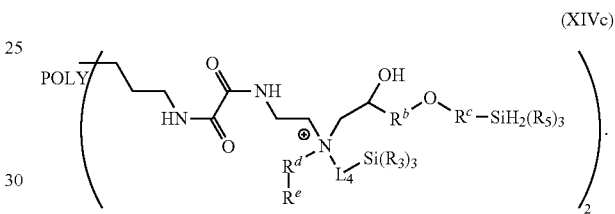
(XIVc)

Embodiment 95 is a compound of any of embodiments 1-64 or 67-94, wherein the compound has a structure of Formula (XV)

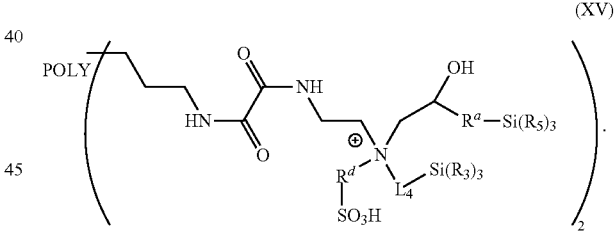
(XV)

Embodiment 96 is a compound of embodiment 95, wherein the compound has a structure of Formula (XVa)

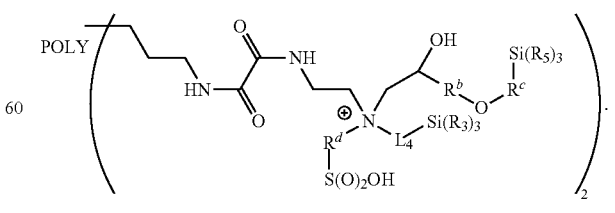
(XVa)

Embodiment 97 is a compound of embodiment 96, wherein the compound has a structure of Formula (XVb)

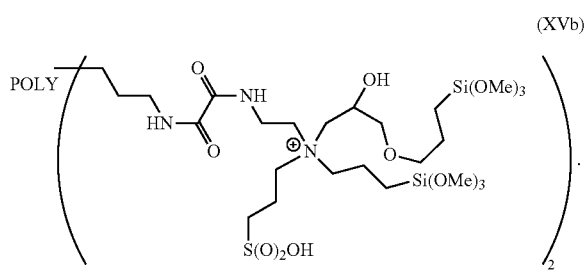

Embodiment 98 is a compound of embodiment 85, wherein the compound has a structure of Formula (XVI)

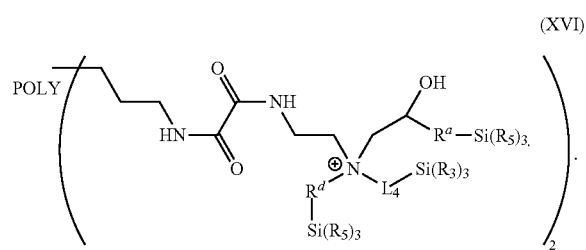

Embodiment 99 is a compound of embodiment 98, wherein the compound has a structure of Formula (XVIa)

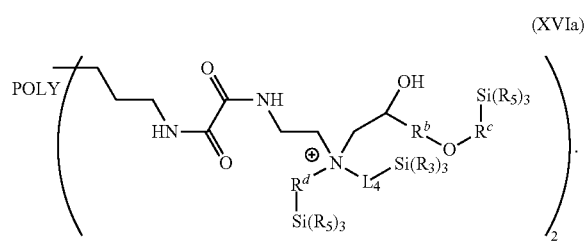

Embodiment 100 is a compound of embodiment 99, wherein the compound has a structure of Formula (XVIb)

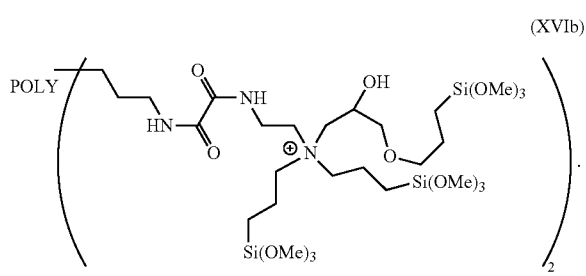

Embodiment 101 is a compound of any of embodiments 84-99, wherein each $R_3$ is hydroxy or alkoxy.

Embodiment 102 is a compound of embodiments 101, wherein each $R_3$ is alkoxy or hydroxy.

Embodiment 103 is a compound of embodiments 102, wherein each $R_3$ is alkoxy.

Embodiment 104 is a compound of any of embodiments 102-103, wherein the alkoxy is methoxy or ethoxy.

Embodiment 105 is a composition comprising an aqueous solution of a compound of any of the preceding embodiments.

Embodiment 106 is a composition comprising an aqueous dispersion of a compound of any of embodiments 1-104.

Embodiment 107 is a composition of any of embodiments 105-106, further comprising an alcohol.

Embodiment 108 is the composition of embodiment 107, wherein the alcohol is selected from methanol, ethanol, and isopropanol.

Embodiment 109 is a composition of any of embodiments 105-108, further comprising one or more surfactants.

Embodiment 110 is a composition of embodiment 109, wherein the one or more surfactants include at least one of a stearate salt, sodium lauryl sulfate, ammonium laryl sulfate, sodium laureth sulfate, polysorbate-20, polysorbate-80, lauryl glucoside, laureth glucoside, disodium lauryl sulfosuccinate, cocamidopropyl betaine, and alpha-olefin sulfonate.

Embodiment 111 is a composition of any of embodiments 109-110, wherein the one or more surfactants comprise at least two surfactants.

Embodiment 112 is the composition of any of embodiments 105-111, further comprising one or more of fragrance, colorant, cleaning agent, tonicity adjusting agent, and pH adjusting agent.

Embodiment 113 is an article having a compound of any of embodiments 1-104 affixed thereto.

Embodiment 114 is an article of embodiment 113, wherein the article comprises glass.

Embodiment 115 is an article of embodiment 114, wherein the glass is a slide, a window, a billboard, a wall, a lens, a prism, a mirror, or a cooktop.

Embodiment 116 is an automobile comprising at least one glass element, wherein a compound of any of embodiments 1-104 is affixed to one or more of the at least one glass element.

EXAMPLES

Materials List
N-[3-(trimethoxysilyl)propyl]ethylenediamine, 96%: Alfa Aesar (Ward Hill, Mass., USA)
Glycidol trimethoxy silane: synthesized
Diethyl oxalate, 99%: Alfa Aesar (Ward Hill, Mass., USA)
Zn(CF$_3$SO$_3$)$_2$, 98%: Alfa Aesar (Ward Hill, Mass., USA)
1,3-propane sulfone, 99%: Alfa Aesar (Ward Hill, Mass., USA)
Epichlorohydrin, 99%: Alfa Aesar (Ward Hill, Mass., USA)
(3-chloropropyl)triethoxysilane: TCI (Portland, Oreg., USA)
Amine-terminated polydimethylsiloxane ($M_n$ of 5104): Gelest (Maidstone, Kent, UK)
Ethyl octadeanedioate: Sigma-Aldrich (St. Louis, Mo., USA)
Sodium methoxide (25 wt % in methanol): Sigma-Aldrich (St. Louis, Mo., USA)
Methanesulfonyl chloride, 98%: Alfa Aesar (Ward Hill, Mass., USA)

Preparatory Example 1

Di-amine terminated PDMS (1020.8 g, number average molecular weight 5104 g/mol)) was added to a 2 L flask with a mechanical stirrer. Diethyloxalate (118.1 g) was added dropwise over 30 minutes. When the reaction mixture appeared homogenous, stirring was stopped and the reaction was allowed to rest for one day. Distillation of methanol and excess diethyloxylate gave the product of Reaction Scheme 3 as a clear liquid.

Reaction Scheme 3

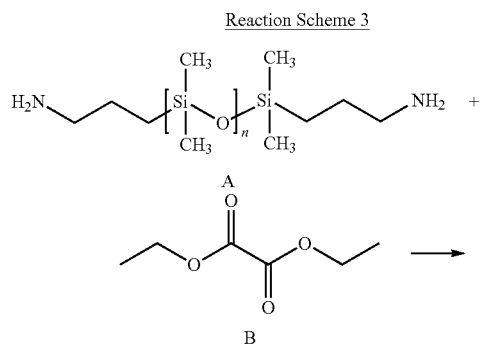

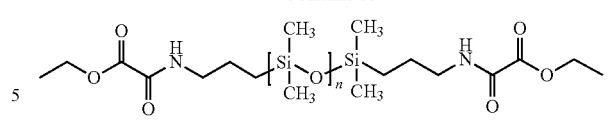

Example 1

The product of Preparatory Example 1 (212 g) was mixed with N-[3-(trimethoxysilyl)propyl]ethylenediamine (19.45 g) and stirred at ambient temperature overnight. Evaporation of methanol provided a compound of Formula (XVI) as shown by Reaction Scheme 4.

Reaction Scheme 4

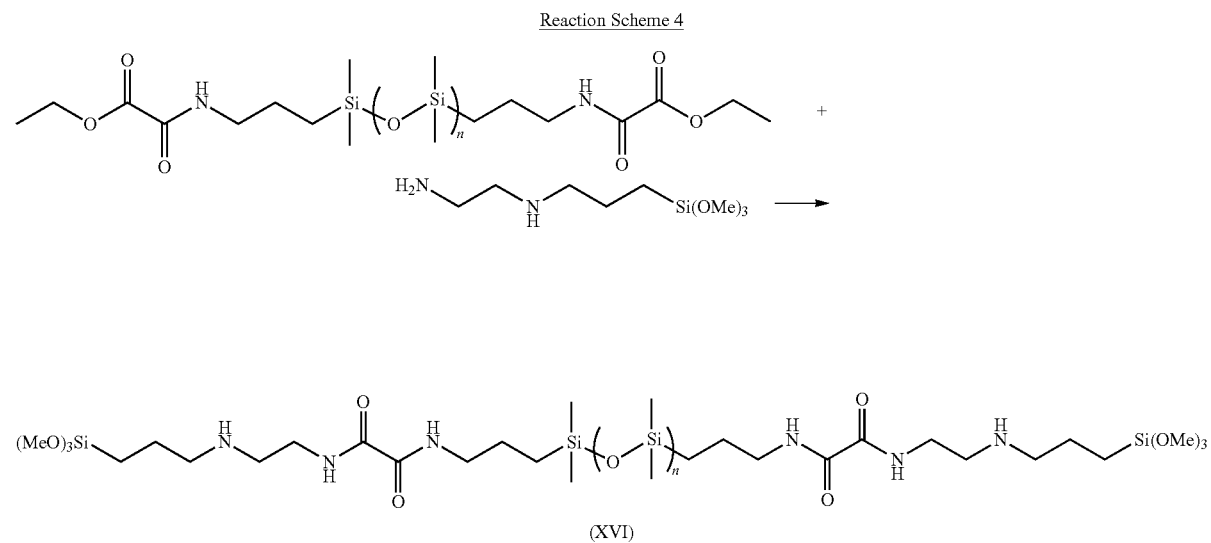

(XVI)

Example 2

The compound of Formula (XVI) (56.6 g), glycidyl trimethoxysilane (4.9 g), and $Zn(CF_3SO_3)_2$ (0.02 g) were stirred at room temperature for 48 hours, providing a compound of Formula (XVII) as shown in Reaction Scheme 5.

Reaction Scheme 5

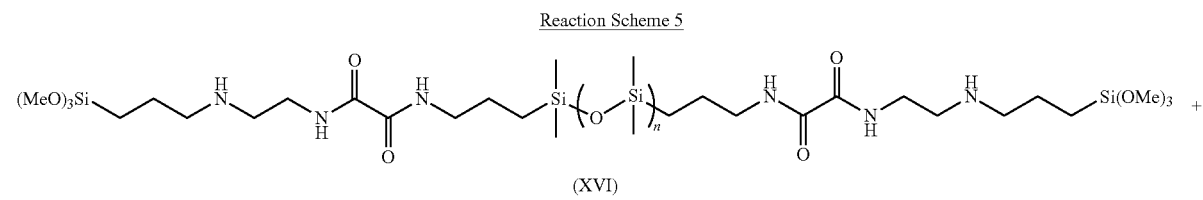
(XVI)

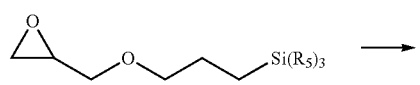

-continued
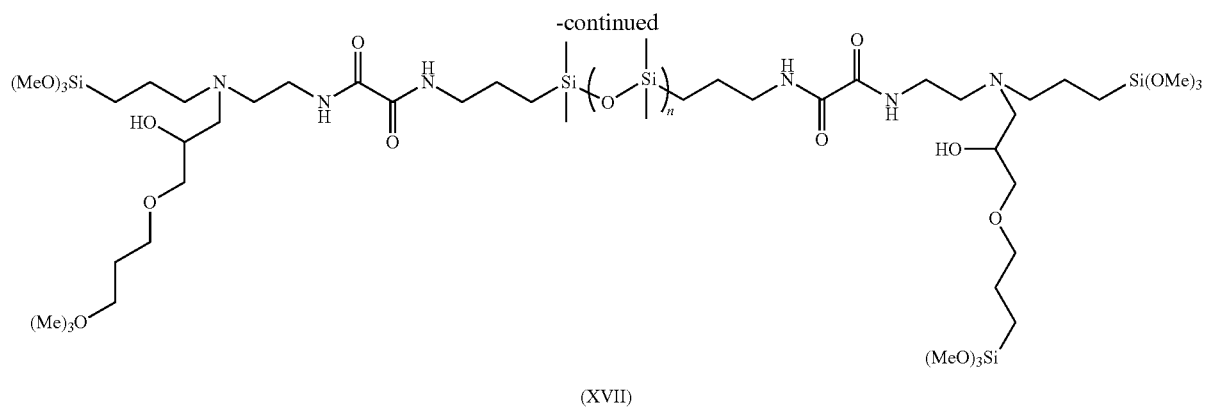
(XVII)
Example 3
The compound of Formula (XVII) (12.26 g) was mixed with 1,3-propanesulfone (2.49 g) and stirred for 48 hours, providing a compound of Formula (XVIII)
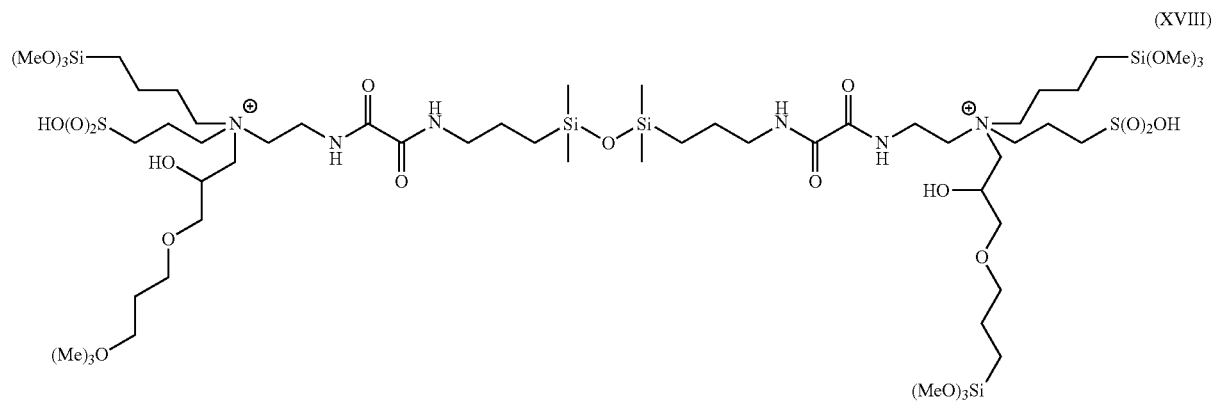
(XVIII)
Example 4
The compound of Formula (XVII) (33.8 g) was mixed with (3-chloropropyl)triethoxysilane (4.92 g) and stirred at 60° C. for 48 hours, providing the product of Formula (XIX).
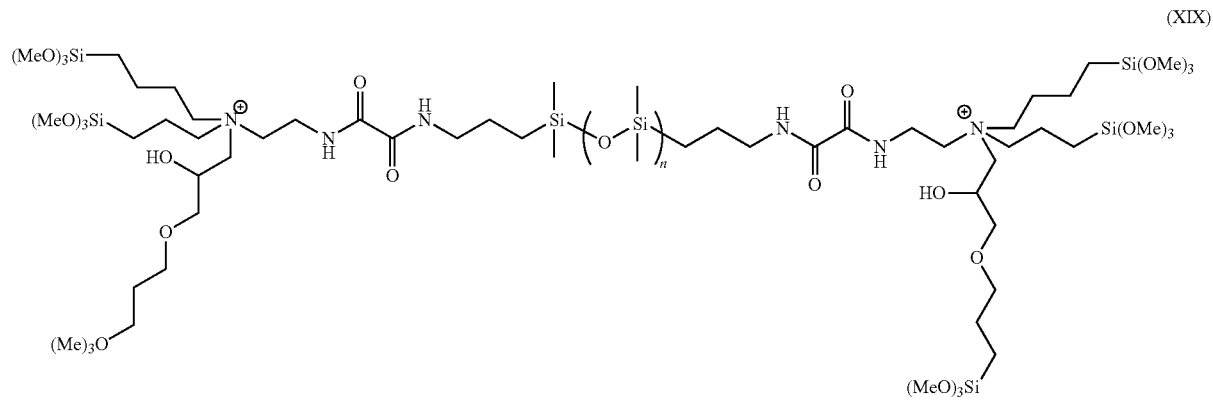
(XIX)

Example 5

The product of Preparatory Example 1 (16.2 g) was mixed with N-[3-(trimethoxysilyl)propyl]ethylenediamine (1.44 g) at 50° C. for five hours and then allowed to cool to ambient temperature. Epichlorohydrin (0.6 g) was added and the mixture was stirred for two days at ambient temperature, providing the compound of Formula (XX).

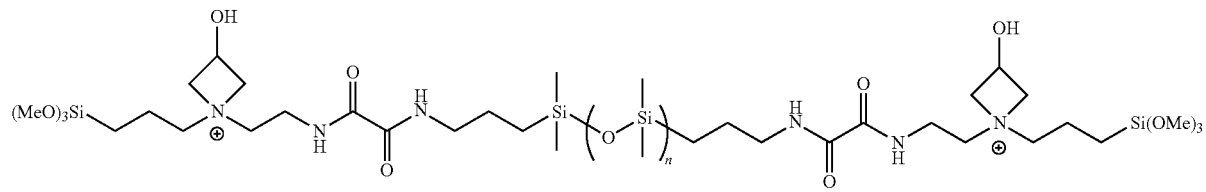

(XX)

Preparatory Example 1 and Examples 1-5 demonstrate that modified poly(diorganosiloxane) compounds can be synthesized under mild conditions. The reactions can be carried out at ambient temperatures or under mild heating.

Comparative Example 1

Ethyl heptadecanoate (26.8 g), N-[3-(trimethoxysilyl)propyl]ethylenediamine (19 g), and sodium methoxide (0.86 g, 25% in methanol) were stirred in toluene (45 g) at 50° C. for 15 hours. The reaction mixture was cooled to room temperature. Epichlorohydrin (3.93 g) was added and stirred for two days. Evaporation of solvent provided the compound of Formula (XXI).

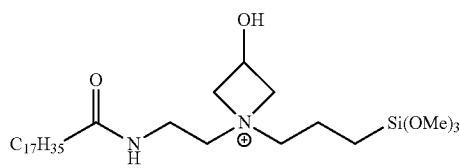

(XXI)

Examples 6-9 and Comparative Example 2

Solutions were formed of 0.1 g of one of the compounds of Formula (XVII), (XVIII), (XIX), (XX), or (XXI), 1 g of isopropyl alcohol, 9.2 g of reverse osmosis water, and sufficient concentrated hydrochloric acid to reach a pH of 2. Each solution was wiped onto a cleaned glass microscope slide with a clean polyester cloth to coat the slide. The coated slides were cured either by allowing the slide to sit at ambient temperature until completely dry (RT curing), or heating to 120° C. for 15 minutes (heat curing). The contact angles, $\theta_A$ and $\theta_R$, of water and hexadecane were measured. Ink repellency was tested by drawing a line with a felt tipped marker and observing any discontinuity of the line. The results are summarized in Table 1.

| Example | Compound | Curing | Water $\theta_A$ | Water $\theta_R$ | Hexadecane $\theta_A$ | Hexadecane $\theta_R$ | Ink Repellancy |
|---|---|---|---|---|---|---|---|
| 6 | (XVII) | RT | 100 | 58 | 40 | 30 | Discontinued line and dots |
|  |  | Heat | 105 | 82 | 38 | 31 | Discontinued line and dots |
| 7 | (XVIII) | RT | 105 | 79 | 37 | 28 | Discontinued line and dots |
|  |  | Heat | 101 | 83 | 35 | 29 | Discontinued line and dots |
| 8 | (XIX) | RT | 103 | 82 | 37 | 30 | Discontinued line and dots |
|  |  | Heat | 106 | 86 | 36 | 32 | Discontinued line and dots |
| 9 | (XX) | RT | 110 | 78 | 41 | 28 | Discontinued dots |
|  |  | Heat | 104 | 75 | 36 | 31 | Discontinued dots |
| Comparative 2 | (XXI) | RT | 76 | 34 | 16 | 11 | Solid line with small patches |
|  |  | Heat | 89 | 47 | 19 | 10 | Solid line with small patches |

The results shown in Table 1 demonstrate that the modified poly(diorganosiloxane) compounds provide a water and ink repellant coating. By comparison, a similar compound having a long chain alkane instead of a poly(diorganosiloxane) (Compound XXI, Comparative Examples 1 and 2) does not provide any of these advantages.

What is claimed is:

1. A compound having the chemical structure of Formula (I)

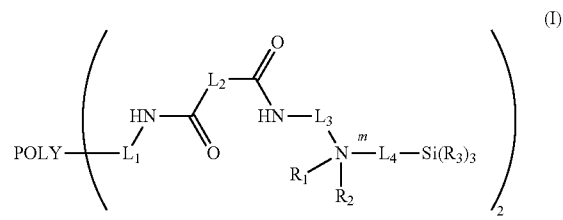

(I)

wherein:
POLY is a poly(diorganosiloxane);
$L_1$ and $L_2$ are independently a covalent bond, alkylene, aralkylene, alkenylene, alkynylene, or arylene;

L₃ and L₄ are independently alkylene, aralkylene, alkenylene, alkynylene, or arylene;

m independently represents the charge on the N atom, which is 0 or 1⁺;

and either:
R₁ is H, CH₂CH(OH)Rᵃ—Si(R₅)₃, or Rᵈ-Rᵉ, and
R₂ is absent, H, CH₂CH(OH)Rᵃ—Si(R₅)₃, or Rᵈ-Rᵉ; or
R₁ and R₂ are covalently bound to one another, and are together alkylene, aralkylene, alkenylene, alkynylene, arylene, or any of the preceding substituted with hydroxy;

R₃ is independently hydroxy, alkoxy, or alkyl, provided that at least one R₃ is either hydroxy or alkoxy;

Rᵃ is alkylene or Rʰ—O—Rᶜ,
Rᵇ is alkylene,
Rᶜ is alkylene,
Rᵈ is alkylene,
Rᵉ is Si(R₅)₃, SO₃H or a salt thereof, or CO₂H or a salt thereof, and R₅ is alkyl, alkoxy, or hydroxy, with the proviso that at least one R₅ is alkoxy or hydroxyl.

2. A compound of claim 1, wherein the poly(dialkylsiloxane) is a poly(di C₁ to C₂₂ alkylsiloxane).

3. A compound of claim 1, wherein the poly(diorganosiloxane) is PDMS.

4. A compound of claim 1, wherein L₁ is alkylene.

5. A compound of claim 1, wherein L₂ is a covalent bond or alkylene.

6. A compound of claim 1, wherein L₃ is alkylene.

7. A compound of claim 1, wherein L₄ alkylene.

8. A compound of claim 1, wherein the compound has a structure of Formula (VIII)

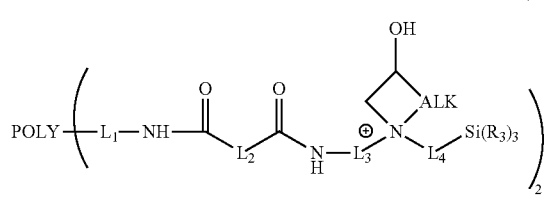

(VIII)

wherein ALK is alkylene.

9. A compound of claim 8, wherein ALK is methylene.

10. A compound of claim 1, wherein the compound has the structure of Formula (XIII)

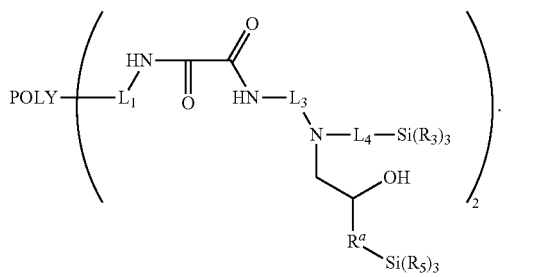

(XIII)

11. A compound of claim 1, wherein the compound has the structure of Formula (XIV)

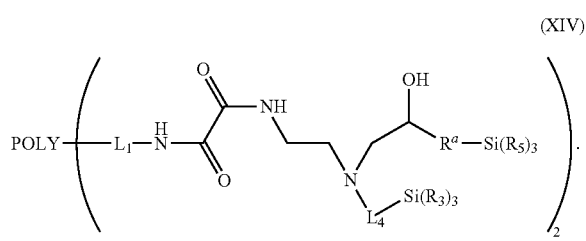

(XIV)

12. A compound of claim 1, wherein the compound has the structure of Formula (XV)

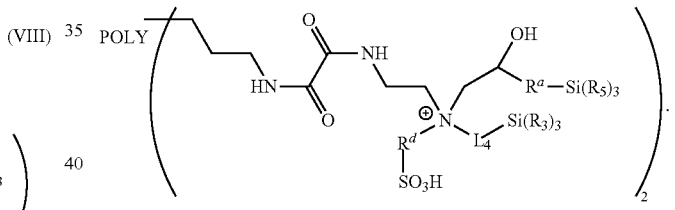

(XV)

13. A composition comprising an aqueous solution or dispersion of the compound of claim 1.

14. An article having the compound of claim 1 affixed thereto.

* * * * *

UNITED STATES PATENT AND TRADEMARK OFFICE
CERTIFICATE OF CORRECTION

PATENT NO. : 10,487,180 B2
APPLICATION NO. : 15/521900
DATED : November 26, 2019
INVENTOR(S) : Yu Yang It is certified that error appears in the above-identified patent and that said Letters Patent is hereby corrected as shown below:

On the Title Page

Abstract, Line 3, Delete "dispersable" and insert -- dispersible --, therefor.

In the Specification

Column 1
Line 58, Delete "Or" and insert -- or --, therefor.

Column 2
Line 31, Delete "molovalent" and insert -- monovalent --, therefor.

Column 4
Line 29, Delete "alkyl" and insert -- alkyl. --, therefor.

Column 5
Line 38, Delete "aryene," and insert -- arylene, --, therefor.

Column 6
Line 59 and 63, Delete "Cu" and insert -- $C_{12}$ --, therefor.

Column 7
Line 1, Delete "Cu" and insert -- $C_{12}$ --, therefor.
Line 8, Delete "grealer," and insert -- greater, --, therefor.
Line 9, Delete "Cu" and insert -- $C_{12}$ --, therefor.
Line 31, Delete "a any" and insert -- any --, therefor.
Line 35 and 38, Delete "Cu" and insert -- $C_{12}$ --, therefor.

Column 10
Line 25, Delete "Cu" and insert -- $C_{12}$ --, therefor.

Signed and Sealed this
Third Day of March, 2020

Andrei Iancu
*Director of the United States Patent and Trademark Office*

Line 53, Delete "propy]" and insert -- propyl] --, therefor.

Column 11
Line 2, Delete "propy]" and insert -- propyl] --, therefor.

Column 12
Line 40, Delete "alkyneyle," and insert -- alkynylene, --, therefor.
Line 41, Delete "akynes," and insert -- alkynes, --, therefor.
Line 45, Delete "aralylenes," and insert -- arylenes, --, therefor.

Column 14
Line 42, Delete "$R^bOR'$." and insert -- $R^bOR^c$. --, therefor.

Column 19
Line 42, Delete "$R^e$," and insert -- $R^c$, --, therefor.

Column 21
Line 53, Delete "laryl" and insert -- lauryl --, therefor.
Line 55, Delete "sulfosucinate," and insert -- sulfosuccinate, --, therefor.

Column 22
Line 20, Delete "formula" and insert -- Formula --, therefor.
Line 50, Delete "R'," and insert -- $R^c$, --, therefor.
Line 60, Delete "poly(diorganoxiloxane)" and insert -- poly(diorganosiloxane) --, therefor.

Column 23
Line 4, Delete "embodiments" and insert -- embodiment --, therefor.

Column 25
Line 4, Delete "$R^e$." and insert -- $R^c$. --, therefor.
Line 8, Delete "$R^c$" and insert -- $R^b$ --, therefor.
Line 29, Delete "embodiments" and insert -- embodiment --, therefor.
Line 42, Delete "$R^e$." and insert -- $R^c$. --, therefor.

Column 29
Line 20, Delete " 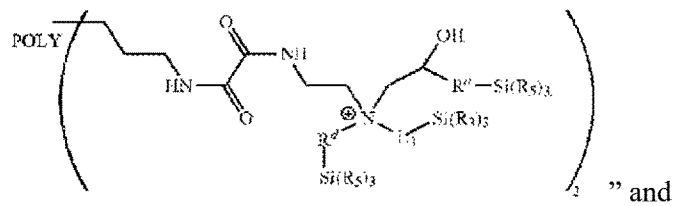 " and

CERTIFICATE OF CORRECTION (continued)
U.S. Pat. No. 10,487,180 B2 insert -- 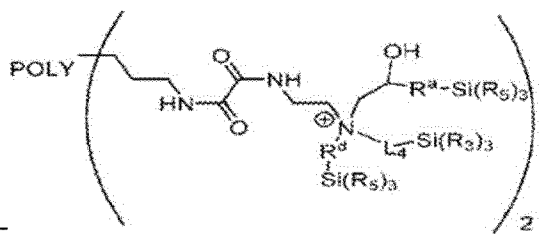 2 --, therefor.
Line 62 and 64, Delete "embodiments" and insert -- embodiment --, therefor.

Column 30
Line 16, Delete "laryl" and insert -- lauryl --, therefor.
Line 18, Delete "sulfosucinate," and insert -- sulfosuccinate, --, therefor.
Line 54, Delete "octadeanedioate:" and insert -- octadecanedioate: --, therefor.

In the Claims

Column 37
Line 14, In Claim 1, delete "R$^h$" and insert -- R$^b$ --, therefor.
Line 30, In Claim 7, after "L$_4$" insert -- is --.

Column 38

Line 1, In Claim 10, delete " 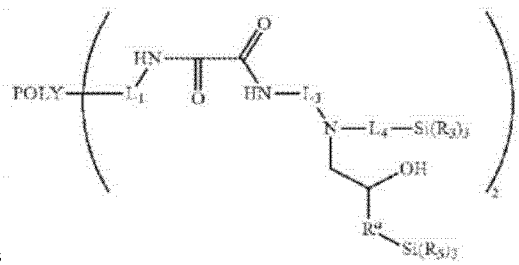 " and insert -- 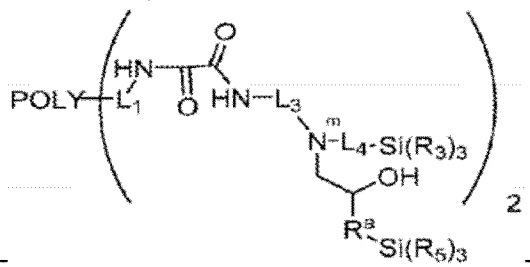 --, therefor.